US012644991B2

(12) United States Patent
So et al.

(10) Patent No.: US 12,644,991 B2
(45) Date of Patent: Jun. 2, 2026

(54) ROBOT DRIVING BY CONTROLLING TOF LiDAR SENSOR AND CONTROLLING METHOD OF THE ROBOT

(71) Applicant: Samsung Electronics Co., Ltd., Suwon-si (KR)

(72) Inventors: Jeayun So, Suwon-si (KR); Jaeyoon Jeong, Suwon-si (KR); Sangsik Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 18/211,892

(22) Filed: Jun. 20, 2023

(65) Prior Publication Data

US 2024/0069208 A1 Feb. 29, 2024

Related U.S. Application Data

(63) Continuation of application No. PCT/KR2023/007465, filed on May 31, 2023.

(30) Foreign Application Priority Data

Aug. 23, 2022 (KR) ........................ 10-2022-0105779

(51) Int. Cl.
  *G01S 17/931* (2020.01)
  *G01S 17/89* (2020.01)
  *G05D 1/00* (2024.01)

(52) U.S. Cl.
  CPC ............ *G01S 17/931* (2020.01); *G01S 17/89* (2013.01); *G05D 1/0219* (2013.01); *G05D 1/0225* (2013.01)

(58) Field of Classification Search
  CPC ........ G01S 17/931; G01S 17/89; G01S 7/484; G01S 7/4868; G01S 17/42; G05D 1/0219;
  (Continued)

(56) References Cited

U.S. PATENT DOCUMENTS

| | | | |
|---|---|---|---|
| 7,467,560 B2 | 12/2008 | Silverman et al. | |
| 7,555,363 B2 | 6/2009 | Augenbraun et al. | |

(Continued)

FOREIGN PATENT DOCUMENTS

| | | |
|---|---|---|
| JP | 2935610 | 8/1999 |
| JP | 2002-28119 | 1/2022 |

(Continued)

OTHER PUBLICATIONS

International Search Report dated Aug. 21, 2023 issued in PCT Application No. PCT/KR2023/007465.

(Continued)

*Primary Examiner* — Abby J Flynn

*Assistant Examiner* — Matthew John Moscola

(74) *Attorney, Agent, or Firm* — STAAS & HALSEY LLP

(57) ABSTRACT

Provided are a robot driven by controlling a time of flight (TOF) light detection and ranging (LiDAR) sensor, and a driving method thereof. The robot outputs laser pulse signals of the TOF LiDAR sensor by switching a laser pulse signal of a short-range pulse energy and a laser pulse signal of a remote pulse energy, while the TOF LiDAR sensor rotates, corrects information about a distance between the robot and peripheral objects of the robot, based on reflection signals of the laser pulse signals, the reflection signals being received from the peripheral objects of the robot, and controls the driving module to move the robot based on the corrected information about the distance.

16 Claims, 17 Drawing Sheets

(58) Field of Classification Search

CPC .... G05D 1/0225; G05D 1/2464; G05D 1/247; G05D 1/648; G05D 1/661; G05D 2105/10; G05D 2107/40; G05D 2109/10; G05D 1/2424; G05D 2111/17; B25J 5/00; B25J 9/16; B25J 11/00; B25J 13/08; B25J 19/02; B25J 5/007; B25J 9/1666; B25J 9/1679; B25J 11/0085; B25J 19/022; A47L 2201/02; A47L 2201/04

See application file for complete search history.

(56)  References Cited

U.S. PATENT DOCUMENTS

| | | | |
|---|---|---|---|
| 8,417,383 B2 | 4/2013 | Ozick et al. | |
| 8,461,803 B2 | 6/2013 | Cohen et al. | |
| 8,483,881 B2 | 7/2013 | Ermakov et al. | |
| 8,516,651 B2 | 8/2013 | Jones et al. | |
| 8,606,401 B2 | 12/2013 | Ozick et al. | |
| 8,903,589 B2 | 12/2014 | Sofman et al. | |
| 8,996,172 B2 | 3/2015 | Shah et al. | |
| 9,144,360 B2 | 9/2015 | Ozick et al. | |
| 9,229,454 B1 | 1/2016 | Chiappetta et al. | |
| 9,271,621 B2 | 3/2016 | Park et al. | |
| 9,678,509 B2 | 6/2017 | Sofman et al. | |
| 9,791,557 B1 | 10/2017 | Wyrwas et al. | |
| 10,088,557 B2 | 10/2018 | Yeun | |
| 10,357,135 B2 | 7/2019 | Son et al. | |
| 10,386,465 B2 | 8/2019 | Hall et al. | |
| 10,539,661 B2 | 1/2020 | Hall et al. | |
| 10,551,501 B1* | 2/2020 | LaChapelle | G01S 7/4818 |
| 10,627,491 B2 | 4/2020 | Hall et al. | |
| 10,962,647 B2 | 3/2021 | Shin et al. | |
| 11,579,298 B2 | 2/2023 | Shin et al. | |
| 11,874,399 B2 | 1/2024 | Shin et al. | |
| 2002/0174506 A1 | 11/2002 | Wallach et al. | |
| 2004/0117064 A1 | 6/2004 | McDonald | |
| 2006/0010995 A1 | 1/2006 | Silverman et al. | |
| 2006/0109657 A1 | 5/2006 | Kuhl | |
| 2009/0306822 A1 | 12/2009 | Augenbraun et al. | |
| 2011/0004339 A1 | 1/2011 | Ozick et al. | |
| 2011/0082585 A1 | 4/2011 | Sofman et al. | |
| 2011/0131741 A1 | 6/2011 | Jones et al. | |
| 2013/0076893 A1 | 3/2013 | Jeong et al. | |
| 2013/0107000 A1 | 5/2013 | Xue et al. | |
| 2015/0112538 A1 | 4/2015 | Jeong et al. | |
| 2017/0050311 A1* | 2/2017 | Yoo | G05B 19/4155 |
| 2017/0112344 A1 | 4/2017 | Koura et al. | |
| 2017/0227647 A1 | 8/2017 | Baik | |
| 2017/0245713 A1 | 8/2017 | Son et al. | |
| 2017/0269209 A1 | 9/2017 | Hall et al. | |
| 2018/0149753 A1 | 5/2018 | Shin et al. | |
| 2018/0203448 A1 | 7/2018 | Kim et al. | |
| 2018/0299899 A1 | 10/2018 | Suvarna et al. | |
| 2018/0325442 A1 | 11/2018 | Lee et al. | |
| 2019/0086539 A1 | 3/2019 | Shin et al. | |
| 2019/0339365 A1 | 11/2019 | Hall et al. | |
| 2019/0353788 A1* | 11/2019 | Otsuka | G01S 17/89 |
| 2020/0037843 A1 | 2/2020 | Fiebig et al. | |
| 2020/0041609 A1* | 2/2020 | Ames | H04B 10/1143 |
| 2020/0230806 A1* | 7/2020 | Choi | B25J 9/0084 |
| 2020/0233434 A1 | 7/2020 | Chiappetta | |
| 2021/0072396 A1 | 3/2021 | Wang et al. | |
| 2021/0096224 A1 | 4/2021 | Lee | |
| 2021/0181347 A1 | 6/2021 | Shin et al. | |
| 2021/0199807 A1 | 7/2021 | Shin et al. | |
| 2021/0228039 A1* | 7/2021 | Brouwers | G05D 1/0242 |
| 2021/0270938 A1 | 9/2021 | Nothern, III et al. | |
| 2022/0011433 A1 | 1/2022 | Fu et al. | |
| 2022/0026920 A1* | 1/2022 | Ebrahimi Afrouzi | |
| | | | G06N 3/0495 |
| 2022/0139086 A1 | 5/2022 | Park et al. | |
| 2022/0244358 A1 | 8/2022 | Doan et al. | |
| 2022/0390569 A1* | 12/2022 | Baron | G01S 17/14 |
| 2023/0277024 A1 | 9/2023 | Jeong et al. | |

FOREIGN PATENT DOCUMENTS

| | | |
|---|---|---|
| KR | 01-25363 | 10/1997 |
| KR | 10-0722762 | 5/2007 |
| KR | 10-1193685 | 10/2012 |
| KR | 10-2013-0137536 | 12/2013 |
| KR | 10-1490170 | 2/2015 |
| KR | 10-2016-0112876 | 9/2016 |
| KR | 10-2017-0093608 | 8/2017 |
| KR | 10-2018-0047055 | 5/2018 |
| KR | 10-2018-0061949 | 6/2018 |
| KR | 10-2018-0064969 | 6/2018 |
| KR | 10-2018-0136059 | 12/2018 |
| KR | 10-2019-0045006 | 5/2019 |
| KR | 10-2019-0117418 | 10/2019 |
| KR | 10-2019-0131402 | 11/2019 |
| KR | 10-2048193 | 1/2020 |
| KR | 10-2063150 | 1/2020 |
| KR | 10-2103291 | 5/2020 |
| KR | 10-2135560 | 7/2020 |
| KR | 10-2137213 | 8/2020 |
| KR | 10-2240518 | 4/2021 |
| KR | 10-2021-0056577 | 5/2021 |
| KR | 10-2263182 | 6/2021 |
| KR | 10-2301759 | 9/2021 |
| KR | 10-2373926 | 3/2022 |
| KR | 10-2022-0101537 | 7/2022 |

OTHER PUBLICATIONS

Written Opinion Report dated Aug. 21, 2023 issued in PCT Application No. PCT/KR2023/007465.

European Search Report dated Sep. 1, 2025, in European Application No. EP 23 85 7490.

* cited by examiner

SHORT-RANGE DISTANCE                  REMOTE DISTANCE

FIG. 4
OPERATION CURRENT
OF TRANSMITTER
mA
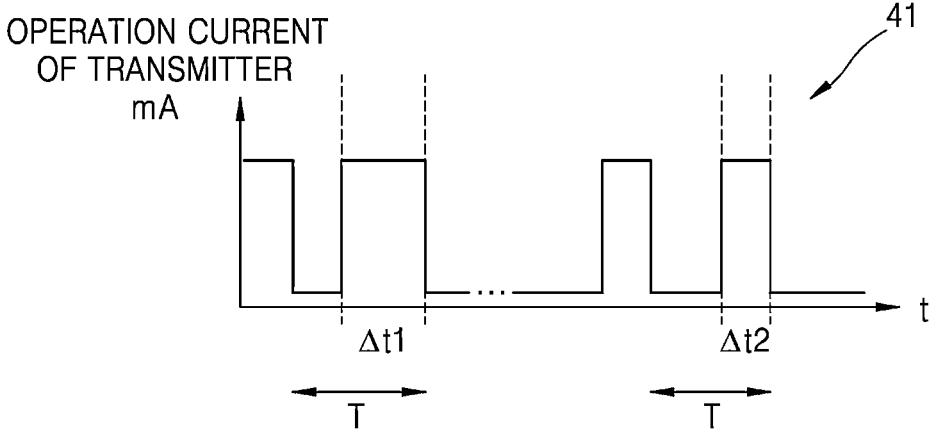
OPERATION CURRENT
OF TRANSMITTER
mA
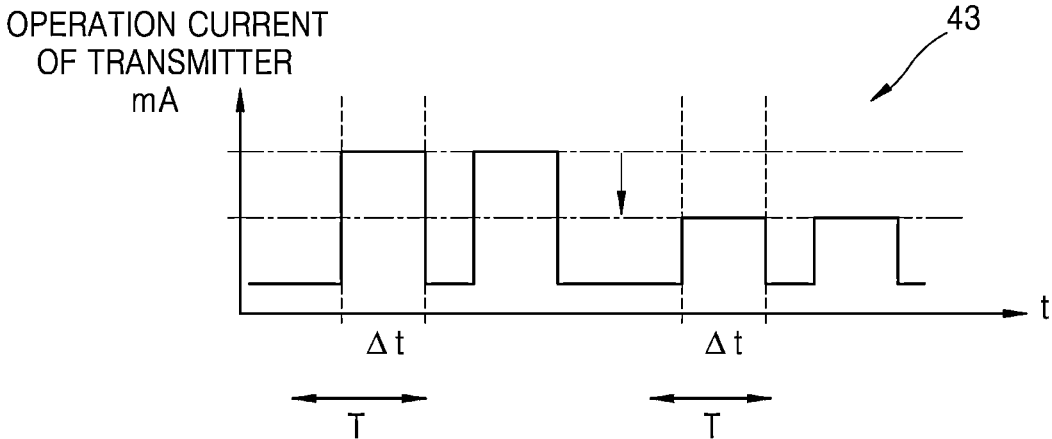

FIG. 5

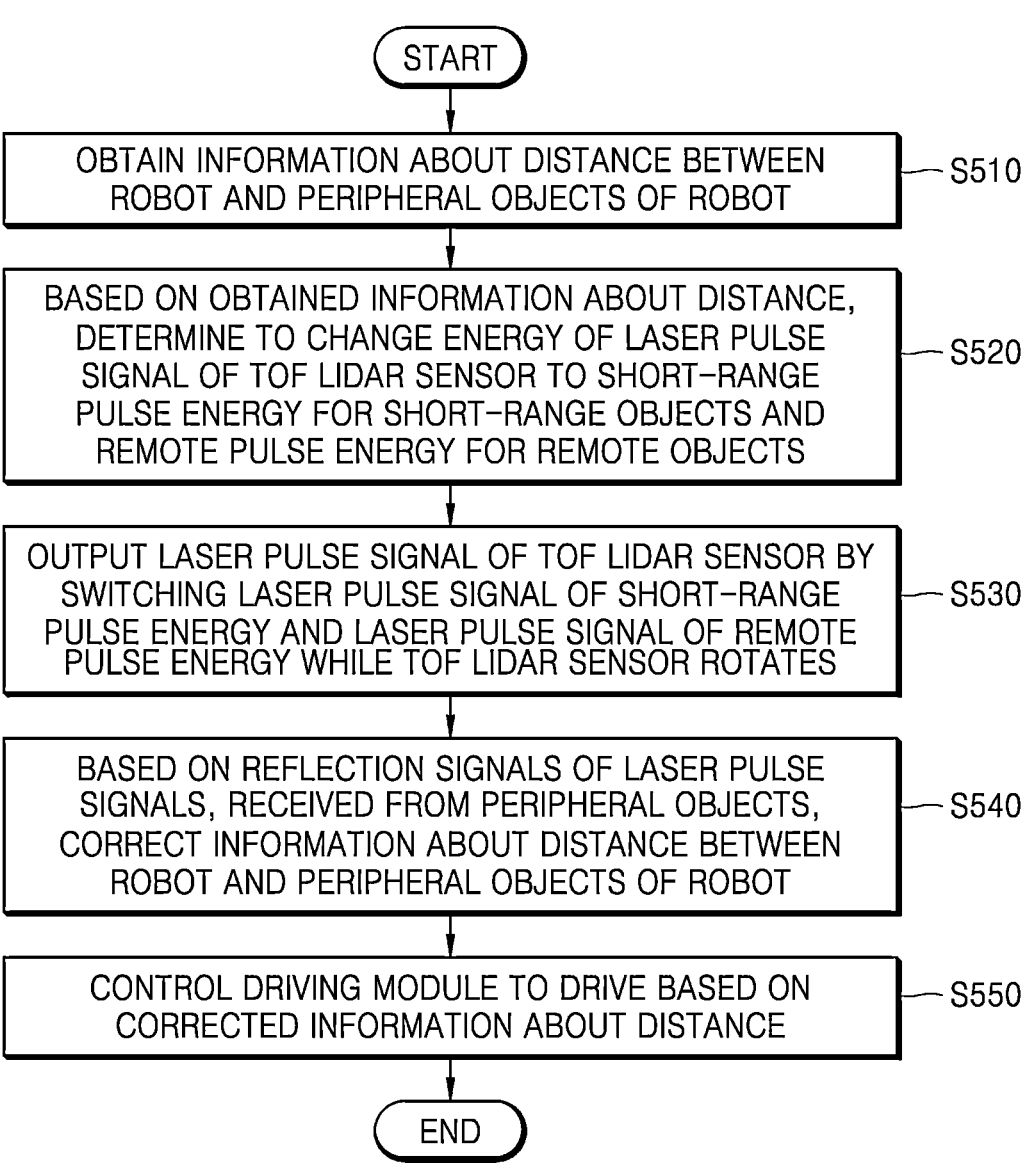

START

OBTAIN INFORMATION ABOUT DISTANCE BETWEEN ROBOT AND PERIPHERAL OBJECTS OF ROBOT — S510

BASED ON OBTAINED INFORMATION ABOUT DISTANCE, DETERMINE TO CHANGE ENERGY OF LASER PULSE SIGNAL OF TOF LIDAR SENSOR TO SHORT-RANGE PULSE ENERGY FOR SHORT-RANGE OBJECTS AND REMOTE PULSE ENERGY FOR REMOTE OBJECTS — S520

OUTPUT LASER PULSE SIGNAL OF TOF LIDAR SENSOR BY SWITCHING LASER PULSE SIGNAL OF SHORT-RANGE PULSE ENERGY AND LASER PULSE SIGNAL OF REMOTE PULSE ENERGY WHILE TOF LIDAR SENSOR ROTATES — S530

BASED ON REFLECTION SIGNALS OF LASER PULSE SIGNALS, RECEIVED FROM PERIPHERAL OBJECTS, CORRECT INFORMATION ABOUT DISTANCE BETWEEN ROBOT AND PERIPHERAL OBJECTS OF ROBOT — S540

CONTROL DRIVING MODULE TO DRIVE BASED ON CORRECTED INFORMATION ABOUT DISTANCE — S550

END

FIG. 6A

SHORT-RANGE DISTANCE

REMOTE DISTANCE

SHORT-RANGE DISTANCE + REMOTE DISTANCE DATA FUSION

ROBOT DRIVING BY CONTROLLING TOF LiDAR SENSOR AND CONTROLLING METHOD OF THE ROBOT

CROSS-REFERENCE TO RELATED APPLICATIONS

This application is a continuation of International Application No. PCT/KR2023/007465 filed on May 31, 2023, and claims foreign priority benefit under 35 U.S.C. § 119 of Korean Patent Application 10-2022-0105779 filed on Aug. 23, 2022, the contents of both of which are incorporated herein by reference.

BACKGROUND

1 Field

The disclosure relates to a robot, a controlling method of the robot, and a computer-readable recording medium having recorded thereon a computer program for executing the controlling method of the robot.

2. Description of Related Art

A light detection and ranging (LiDAR) sensor is a technique using a laser signal for recognizing a peripheral object. When a pulse laser signal that is emitted from the LiDAR sensor collides with the peripheral object and is reflected, a received reflection signal may be analyzed to identify a position, a moving direction, a speed, etc. of the peripheral object and generate a real time map (two-dimensional (2D) or three-dimensional (3D)) of a peripheral environment.

The LiDAR sensor may be divided into a time of flight (TOF) method and a phase shift (PS) method according to a modulation method of the emitted laser signal. According to the TOF method, a distance to an object is measured based on a time period between a time point at which a laser pulse signal is emitted from a LiDAR sensor and a time point at which the laser pulse signal is reflected from an object within a measurement range and returns to a receiver of the LiDAR sensor. Also, according to the PS method, a distance to an object is measured by emitting a laser beam modulated as a predetermined wave and by taking into account a phase change amount between the emitted laser signal and a laser signal reflected from the object and returning.

SUMMARY

According to an aspect of an embodiment of the disclosure, there is provided a robot including a driving module configured to move the robot, a time of flight (TOF) light detection and ranging (LiDAR) sensor, at least one memory storing one or more instructions, and at least one processor configured to execute the one or more instructions stored in the at least one memory to obtain information about a distance between the robot and peripheral objects of the robot, determine, based on the obtained information about the distance, to change an energy of a laser pulse signal of the TOF LiDAR sensor to a short-range pulse energy for short-range objects and a remote pulse energy for remote objects, output laser pulse signals of the TOF LiDAR sensor by switching a laser pulse signal of the short-range pulse energy and a laser pulse signal of the remote pulse energy, while the TOF LiDAR sensor rotates, correct the information about the distance between the robot and the peripheral objects of the robot, based on reflection signals of the laser pulse signals, the reflection signals being received from the peripheral objects of the robot, and control the driving module to move the robot based on the corrected information about the distance.

According to an aspect of an embodiment of the disclosure, the at least one processor is further configured to execute the one or more instructions stored in the at least one memory to obtain the information about the distance between the robot and the peripheral objects of the robot, by outputting, to a peripheral position of the robot, a laser pulse signal of a default pulse energy.

According to an aspect of an embodiment of the disclosure, the at least one processor is further configured to execute the one or more instructions stored in the at least one memory to obtain the information about the distance between the robot and the peripheral objects of the robot, based on a pre-stored map indicating positions of the peripheral objects of the robot and a position of the robot on the pre-stored map.

According to an aspect of an embodiment of the disclosure, the at least one processor is further configured to execute the one or more instructions stored in the at least one memory to output the laser pulse signal of the short-range pulse energy during a rotation cycle of the TOF LiDAR sensor and output the laser pulse signal of the remote pulse energy during a next rotation cycle of the rotation cycle.

According to an aspect of an embodiment of the disclosure, the at least one processor is further configured to execute the one or more instructions stored in the at least one memory to output the laser pulse signal of the short-range pulse energy according to an angular range of the short-range objects and output the laser pulse signal of the remote pulse energy according to an angular range of the remote objects.

According to an aspect of an embodiment of the disclosure, the at least one processor is further configured to execute the one or more instructions stored in the at least one memory to generate a short-range map based on a reflection signal of the laser pulse signal of the short-range pulse energy, generate a remote map based on a reflection signal of the laser pulse signal of the remote pulse energy, and combine the short-range map and the remote map so as to generate a map about the peripheral objects of the robot.

According to an aspect of an embodiment of the disclosure, the at least one processor is further configured to execute the one or more instructions stored in the at least one memory to identify a type of at least one object from among the peripheral objects of the robot as a chair or a table; when the chair or the table is identified, start an intensive cleaning mode for intensively cleaning a space between legs of the chair or the table; and, based on the start of the intensive cleaning mode, output the laser pulse signal of the short-range pulse energy during the rotation cycle of the TOF LiDAR sensor and output the laser pulse signal of the remote pulse energy during the next rotation cycle.

According to an aspect of an embodiment of the disclosure, the at least one processor is further configured to execute the one or more instructions stored in the at least one memory to identify an obstacle from among the peripheral objects of the robot, start an obstacle-outline-following mode for deviating from a predetermined driving route and following an outline of the identified obstacle, and based on the start of the obstacle-outline-following mode, output the laser pulse signal of the short-range pulse energy during the rotation cycle of the TOF LiDAR sensor and output the laser pulse signal of the remote pulse energy during the next rotation cycle.

According to an aspect of an embodiment, the at least one processor is further configured to execute the one or more instructions stored in the at least one memory to, when the robot detects a docking guide signal that is output from a charge station while the robot returns to the charge station to dock to the charge station, output the laser pulse signals of the TOF LiDAR sensor, based on a docking pulse energy for reducing interference with respect to the docking guide signal.

According to an aspect of an embodiment of the disclosure, the at least one processor is further configured to execute the one or more instructions stored in the at least one memory to determine a cleaning area along which the robot is to move, and determine, based on a size of the cleaning area, a size of the short-range pulse energy.

According to an aspect of an embodiment of the disclosure, there is provided a driving method of a robot, the driving method including obtaining information about a distance between the robot and peripheral objects of the robot, determining, based on the obtained information about the distance, to change a pulse energy of a laser pulse signal of a time of flight (TOF) light detection and ranging (LiDAR) sensor to a short-range pulse energy for short-range objects and a remote pulse energy for remote objects, outputting laser pulse signals of the TOF LiDAR sensor by switching a laser pulse signal of the short-range pulse energy and a laser pulse signal of the remote pulse energy, while the TOF LiDAR sensor rotates, correcting the information about the distance between the robot and the peripheral objects of the robot, based on reflection signals of the laser pulse signals, the reflection signals being received from the peripheral objects of the robot, and moving the robot based on the corrected information about the distance.

According to an aspect of an embodiment of the disclosure, the obtaining of the information about the distance between the robot and the peripheral objects of the robot includes obtaining the information about the distance between the robot and the peripheral objects of the robot, by outputting, to a peripheral position of the robot, a laser pulse signal of a default pulse energy.

According to an aspect of an embodiment of the disclosure, the obtaining of the information about the distance between the robot and the peripheral objects of the robot includes obtaining the information about the distance between the robot and the peripheral objects of the robot, based on a pre-stored map indicating positions of the peripheral objects of the robot and a position of the robot on the pre-stored map.

According to an aspect of an embodiment of the disclosure, the outputting of the laser pulse signals of the TOF LiDAR sensor includes outputting the laser pulse signal of the short-range pulse energy during a rotation cycle of the TOF LiDAR sensor and outputting the laser pulse signal of the remote pulse energy during a next rotation cycle of the rotation cycle.

According to an aspect of an embodiment of the disclosure, the outputting of the laser pulse signals of the TOF LiDAR sensor includes outputting the laser pulse signal of the short-range pulse energy according to an angular range of the short-range objects and outputting the laser pulse signal of the remote pulse energy according to an angular range of the remote objects.

According to an aspect of an embodiment of the disclosure, the correcting of the information about the distance between the robot and the peripheral objects of the robot includes generating a short-range map based on a reflection signal of the laser pulse signal of the short-range pulse energy, generating a remote map based on a reflection signal of the laser pulse signal of the remote pulse energy, and combining the short-range map and the remote map so as to generate a map about the peripheral objects of the robot.

According to an aspect of an embodiment of the disclosure, the determining to change the energy of the laser pulse signal of the TOF LiDAR sensor to the short-range pulse energy and the remote pulse energy includes identifying a type of at least one object from among the peripheral objects of the robot as a chair or a table; when the chair or the table is identified, starting an intensive cleaning mode for intensively cleaning a space among legs of the chair or the table; and, based on the start of the intensive cleaning mode, determining to change the energy of the laser pulse signal of the TOF LiDAR sensor to the short-range pulse energy and the remote pulse energy.

According to an aspect of an embodiment of the disclosure, the determining to change the energy of the laser pulse signal of the TOF LiDAR sensor to the short-range pulse energy and the remote pulse energy further includes identifying an obstacle from among the peripheral objects of the robot; starting an obstacle-outline-following mode for deviating from a predetermined driving route and following an outline of the identified obstacle; and, based on the start of the obstacle-outline-following mode, determining to change the energy of the laser pulse signal of the TOF LiDAR sensor to the short-range pulse energy and the remote pulse energy.

According to an aspect of an embodiment of the disclosure, the driving method further includes, when the robot returns to a charge station to dock to the charge station, detecting a docking guide signal that is output from the charge station; and when the docking guide signal is detected, outputting the laser pulse signals of the TOF LiDAR sensor, based on a docking pulse energy for reducing interference with respect to the docking guide signal.

According to an aspect of an embodiment of the disclosure, there is provided a computer-readable recording medium having recorded thereon a program for executing, on a computer, the driving method of the robot.

BRIEF DESCRIPTION OF DRAWINGS

FIG. 4 illustrates a method, performed by a robot, of adjusting an energy of a laser pulse signal, according to an embodiment of the disclosure.

FIG. 5 illustrates a method, performed by a robot, of adjusting a laser pulse energy, according to an embodiment of the disclosure.

FIGS. 6A and 6B illustrate a method, performed by a robot, of combining distance information obtained based on a short-range pulse energy and distance information obtained based on a remote pulse energy, according to an embodiment of the disclosure.

FIG. 7 illustrates a method, performed by a robot, of switching a remote pulse energy and a short-range pulse energy according to an angular range of objects, according to an embodiment of the disclosure.

FIG. 13 illustrates a method, performed by a robot, of changing a pulse energy, when the robot returns to a charge station, according to an embodiment of the disclosure.

DETAILED DESCRIPTION

Throughout the disclosure, the expression "at least one of a, b or c" indicates only a, only b, only c, both a and b, both a and c, both b and c, all of a, b, and c, or variations thereof.

The terms used in the disclosure should not be interpreted merely by the terms, but should be interpreted based on the meaning of the terms and the content throughout the disclosure.

Also, terms such as "the first," "the second," etc. may be used to describe various components, but the components are not limited by these terms. The terms are used only for distinguishing one component from another component.

Also, the terms used in the disclosure are merely used to describe a pre-determined embodiment of the disclosure and are not aimed to limit the disclosure. Unless a singular meaning is apparent contextually, a singular expression may include a plural meaning. Also, throughout the specification, when a part is referred to as being "connected" to other parts, the part may be "directly connected" to the other parts or may be "electrically connected" to the other parts with other devices therebetween. Also, when a part "includes" a certain element, unless it is specifically mentioned otherwise, the part may further include another component and may not exclude the other component.

An expression such as "in some embodiments of the disclosure" or "according to an embodiment of the disclosure" described in various parts of this specification does not necessarily refer to the same embodiment.

According to embodiments of the disclosure, there are provided a robot for changing, according to a distance to a peripheral object of the robot, a pulse energy of a laser pulse signal of a time of flight (TOF) light detection and ranging (LiDAR) sensor and a controlling method of the robot.

Also, according to embodiments of the disclosure, there are provided a robot for changing, according to a cleaning mode of the robot, a pulse energy of a laser pulse signal of a TOF LiDAR sensor and a controlling method of the robot.

Also, according to embodiments of the disclosure, there are provided are a robot for changing, in a docking mode of the robot, a pulse energy of a laser pulse signal of a TOF LiDAR sensor and a controlling method of the robot.

Figure 1:
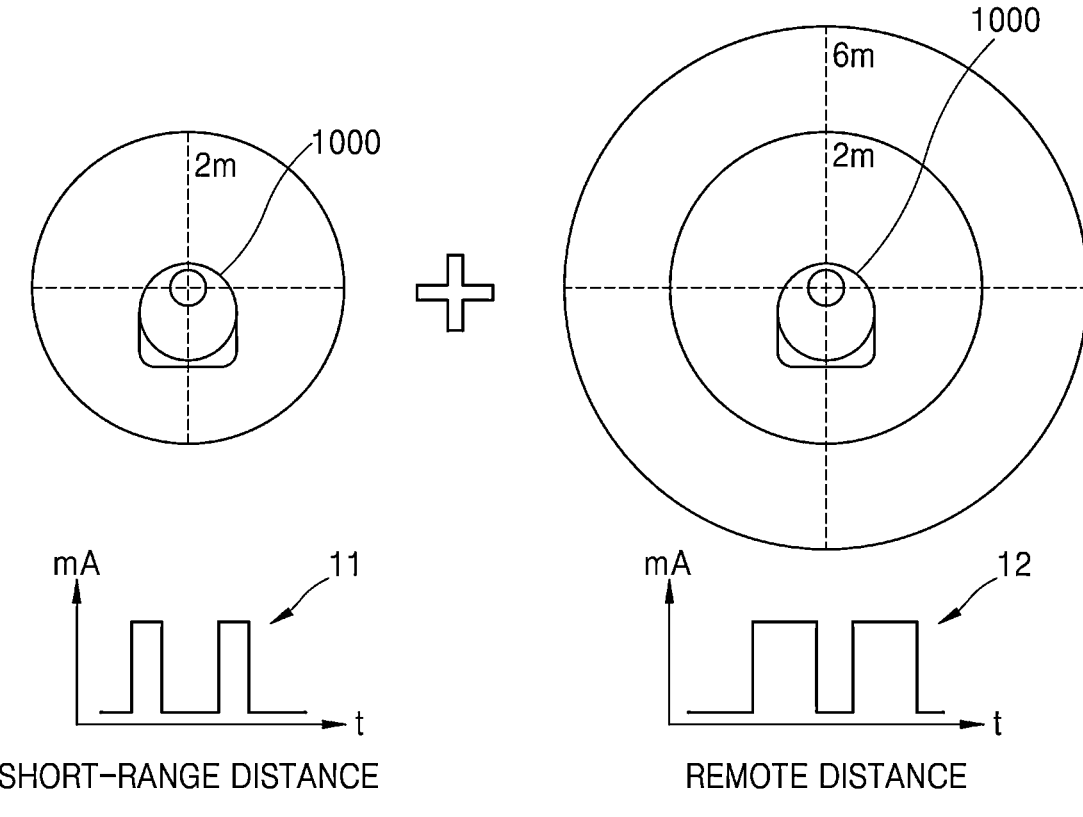
FIG. 1 illustrates a method, performed by a robot, of adjusting a pulse energy of a laser pulse signal of a time of flight (TOF) light detection and ranging (LiDAR) sensor, according to an embodiment of the disclosure.

FIG. 1 illustrates a method, performed by a robot 1000, of adjusting a pulse energy of a laser pulse signal of a TOF LiDAR sensor, according to an embodiment of the disclosure.

Referring to FIG. 1, the robot 1000 may output a laser pulse signal by controlling the TOF LiDAR sensor. The robot 1000 may determine a distance to an object, based on a time period from a time point at which the laser pulse signal is output to a time point at which the laser pulse signal is reflected from the object and received again by the robot 1000.

The TOF LiDAR sensor may include a transmitter emitting a laser pulse signal and a receiver receiving a reflection signal of the emitted laser pulse signal. The robot 1000 may adjust a pulse energy of the laser pulse signal by controlling a width and a size of a current applied to the transmitter of the TOF LiDAR sensor.

For example, a first graph 11 and a second graph 12 of FIG. 1 indicate currents applied to the transmitter according to time. When a cycle of the current applied to the transmitter is the same, the width of the current of the first graph 11 of FIG. 1 is less than the width of the current of the second graph 12, and thus, a first pulse energy according to the current of the first graph 11 is less than a second pulse energy according to the current of the second graph 12.

As the energy of the laser pulse signal is increased, the laser pulse signal may reach a farther distance. However, as the energy of the laser pulse signal is increased, effects of diffused reflection may increase, and thus, a distance to objects located in a short range may not be accurately measured. Therefore, according to an embodiment of the disclosure, the robot 1000 may transmit a laser pulse signal having a low energy to detect a distance to objects located in a short range and a laser pulse signal having a high energy to detect a distance to objects located in a remote distance.

For example, referring to FIG. 1, the robot 1000 may use different pulse energies to recognize a remote object and a short-range object based on a reference distance. For example, when the reference distance is 2 m, the robot 1000 may obtain distance information about short-range objects within 2 m, based on a laser pulse signal having a first pulse energy, and may obtain distance information about remote objects in 2 m to 6 m, based on a laser pulse signal having a second pulse energy, which is higher than the first pulse energy.

In this case, the first pulse energy may seldom generate the effect of diffused reflection, even when a laser pulse signal having the first pulse energy is emitted to the objects within 2 m from the robot 1000. Also, the second pulse energy may enable obtaining of the distance information about an object apart from the robot 1000 by up to 6 m, which is a threshold distance, and may minimize the effect of diffused reflection on the objects in 2 m to 6 m from the robot 1000.

According to an embodiment of the disclosure, the robot 1000 may drive by switching a laser pulse signal of a short-range pulse energy and a laser pulse signal of a remote pulse energy for each rotation cycle of the TOF LiDAR sensor.

Also, according to an embodiment of the disclosure, the robot 1000 may obtain an angular range of short-range objects and an angular range of remote objects and, during one rotation cycle of the TOF LiDAR sensor, may transmit the laser pulse signal having the short-range pulse energy, in the angular range of the short-range objects, and may transmit the laser pulse signal having the remote pulse energy, in the angular range of the remote objects.

According to an embodiment of the disclosure, the robot 1000 may determine a distance to peripheral objects of the robot 1000 by combining distance information according to the short-range pulse energy and distance information according to the remote pulse-energy.

For example, in order to determine the distance to the peripheral objects of the robot 1000, the robot 1000 may combine the distance information according to the short-range pulse energy and the distance information according to the remote pulse energy by increasing a weight to the distance information according to the short-range pulse energy as a distance of an object to the robot 1000 decreases and by increasing a weight to the distance information according to the remote pulse energy as a distance of an object to the robot 1000 increases.

Also, for example, the robot 1000 may obtain the angular range of the short-range objects and the angular range of the remote objects, based on positions of the objects. Based on the distance information obtained according to the angular range of the short-range objects and the laser pulse signal of the short-range pulse energy, the robot 1000 may obtain the distance information with respect to the short-range objects. Also, based on the distance information obtained according to the angular range of the remote objects and the laser pulse signal of the remote pulse energy, the robot 1000 may obtain the distance information with respect to the remote objects. The robot 1000 may determine the distance to the peripheral objects of the robot 1000 by combining the distance information with respect to the short-range objects and the distance information with respect to the remote objects.

The robot 1000 may generate a map or correct a pre-generated map based on the distance to the peripheral objects of the robot 1000. Also, the robot 1000 may drive by driving a driving module based on the generated or corrected map.

In order to determine a pulse energy, the robot 1000 may first obtain a distance to peripheral objects of the robot 1000. For example, the robot 1000 may obtain the distance to the peripheral objects of the robot 1000, based on a pre-stored map and a position of the robot 1000 on the map. Also, for example, before emitting the laser pulse signals of the short-range pulse energy and the remote pulse energy, the robot 1000 may approximately determine the distance to the peripheral objects of the robot 1000 by emitting a laser pulse signal of a default pulse energy during one cycle of the TOF LiDAR sensor.

The robot 1000 may change an energy of the laser pulse signal based on a cleaning mode.

For example, the robot 1000 may perform an intensive cleaning mode in which the robot 1000 deviates from a pre-determined driving route and performs intensive cleaning on a floor beneath a chair or a table by identifying, during driving, the chair or the table in a cleaning area. As the intensive cleaning mode is started, the robot 1000 may, by switching a laser pulse signal of a short-range pulse energy and a laser pulse signal of a remote pulse energy for each rotation cycle of the TOF LiDAR sensor, accurately calculate a distance from the robot 1000 to the legs of the chair or the table and relatively more accurately determine a position of the legs of the chair or the table on a map.

Also, for example, as the intensive cleaning mode is started during driving of the robot 1000, the robot 1000 may accurately calculate the distance from the robot 1000 to the legs of the chair or the table by driving by using only the laser pulse signal of the short-range pulse energy.

Also, for example, when the robot 1000, during driving, follows an obstacle or identifies an object which the robot 1000 may have to be apart from by a predetermined distance, such as dog poop or a cup, the robot 1000 may drive by switching the laser pulse signal of the short-range pulse energy and the laser pulse signal of the remote pulse energy. Based on this configuration, the robot 1000 may relatively more accurately determine the position of the object on the map, such as an obstacle, dog poop, or a cup, and may relatively more accurately calculate the distance from the robot 1000 to the object, such as the obstacle, the dog poop, or the cup.

The robot 1000 may reduce the energy of the laser pulse signal to prevent interference between a docking guide signal emitted from a charge station for docking to the charge station and the laser pulse signal.

Figure 2:
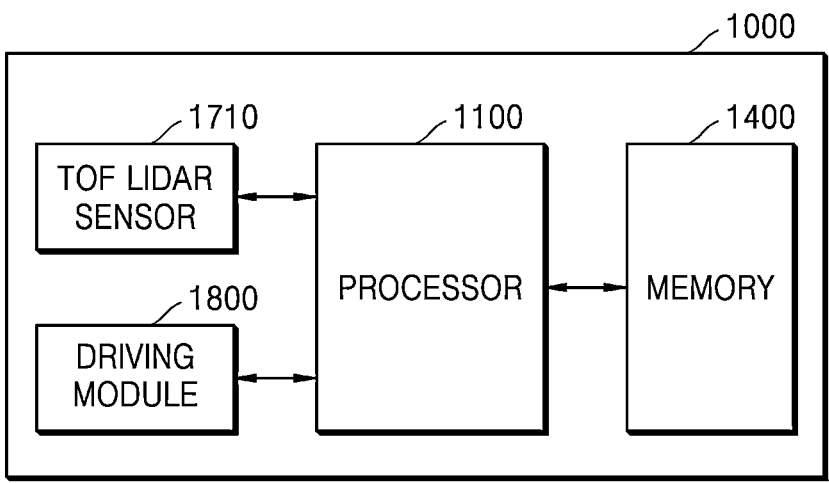
FIG. 2 is a block diagram of a robot according to an embodiment of the disclosure.

FIG. 2 is a block diagram of the robot 1000 according to an embodiment of the disclosure.

Referring to FIG. 2, the robot 1000 may include a processor 1100, a memory 1400, a driving module 1800, and a TOF LiDAR sensor 1710.

The processor 1100 may control general operations of the robot 1000. The processor 1100 may execute one or more instructions or programs stored in the memory 1400 to control the driving module 1800 and the TOF LiDAR sensor 1710.

The memory 1400 may store the instructions or the programs for processing and controlling by the processor 1100.

The driving module 1800 may move a main body of the robot 1000. The driving module 1800 may be driven according to a control signal configured by the processor 1100. The processor 1100 may configure a driving route and may generate the control signal for having the robot 1000 move according to the driving route and transmit the control signal to the driving module 1800. The driving module 1800 may include a motor driving wheels of the robot 1000 by rotating the wheels of the robot 1000, a timing belt mounted to transfer power generated from a rear wheel to a front wheel, etc.

The TOF LiDAR sensor 1710 may include a transmitter (not shown) emitting a laser pulse signal and a receiver (not shown) receiving a reflection signal of the emitted laser pulse signal. The transmitter emitting the laser pulse signal may include a ruby laser, a neodymium yag (Nd:YAG) laser, a titanium sapphire (Ti:Sapphire) laser, a neodynimum glass (Nd:Glass) laser, a laser diode (Ga, Al, or As), an excimer laser, a free electron laser, or the like, but is not limited thereto.

The receiver of the TOF LiDAR sensor 1710 may include an optical sensor, such as a complementary metal-oxide semiconductor (CMOS) image sensor or a charge coupled device (CCD) image sensor, but is not limited thereto.

The processor 1100 may cyclically output a laser pulse signal by controlling the transmitter of the TOF LiDAR sensor 1710. The processor 1100 may adjust an energy of the laser pulse signal by adjusting power of the laser pulse signal or a pulse width of the laser pulse signal. For example, the processor 1100 may adjust the power of the laser pulse signal by adjusting a size of an operation current applied to the transmitter of the TOF LiDAR sensor 1710. Also, the processor 1100 may adjust the pulse width of the laser pulse signal by controlling a pulse width of the operation current applied to the transmitter of the TOF LiDAR sensor 1710. According to an embodiment of the disclosure, the processor 1100 may adjust the pulse width of the laser pulse signal by controlling a duty ratio of the operation current.

According to an embodiment of the disclosure, the processor 1100 may output a laser pulse signal having a default pulse energy. The robot 1000 may determine a distance to an object within a first reference distance from the robot 1000, based on the default pulse energy. For example, the robot 1000 may determine a distance to an object within a radius of about 6 m, based on the default pulse energy. The robot 1000 may determine the distance to a peripheral object of the robot 1000 within the first reference distance, by rotating while outputting the default pulse energy.

Also, the processor 1100 may output a laser pulse signal having a short-range pulse energy. Also, the processor 1100 may output a laser pulse signal having a remote pulse energy. The short-range pulse energy may be less than the default pulse energy. The robot 1000 may determine a distance to an object within a second reference distance from the robot 1000, based on the short-range pulse energy. For example, the robot 1000 may determine a distance to an object within a radius of about 2 m, by rotating while outputting the short-range pulse energy. The remote pulse energy may be equal to the default pulse energy or may be greater than the default pulse energy.

In the disclosure, an example in which the remote pulse energy is equal to the default pulse energy will be mainly described. However, the remote pulse energy may be greater than the default pulse energy, and in this case, a distance to an object detected based on the remote pulse energy may be greater than the first reference distance. The robot 1000 may determine a distance to an object within a first reference distance from the robot 1000, based on the remote pulse energy. For example, the robot 1000 may determine a distance to an object within a radius of about 6 m, by rotating while outputting the remote pulse energy.

While the processor 100 controls the TOF LiDAR sensor 1710 to emit the pulse energy, the processor 100 may control the driving module 1800 to move or rotate the robot 1000.

Also, the processor 1100 may determine a rotation cycle of the TOF LiDAR sensor 1710 and may rotate the TOF LiDAR sensor 1710 according to the determined rotation cycle. For example, the processor 1100 may rotate the TOF LiDAR sensor 1710 about ten times for one second. The TOF LiDAR sensor 1710 may rotate by being coupled to a rotation member. The processor 1100 may control the rotation member to rotate the TOF LiDAR sensor 1710. The rotation member may include, for example, a motor, a rotation shaft, and a support member supporting the TOF LiDAR sensor 1710.

Also, the processor 1100 may output several to dozens of laser pulse signals during one rotation cycle of the TOF LiDAR sensor 1710.

Figure 3:
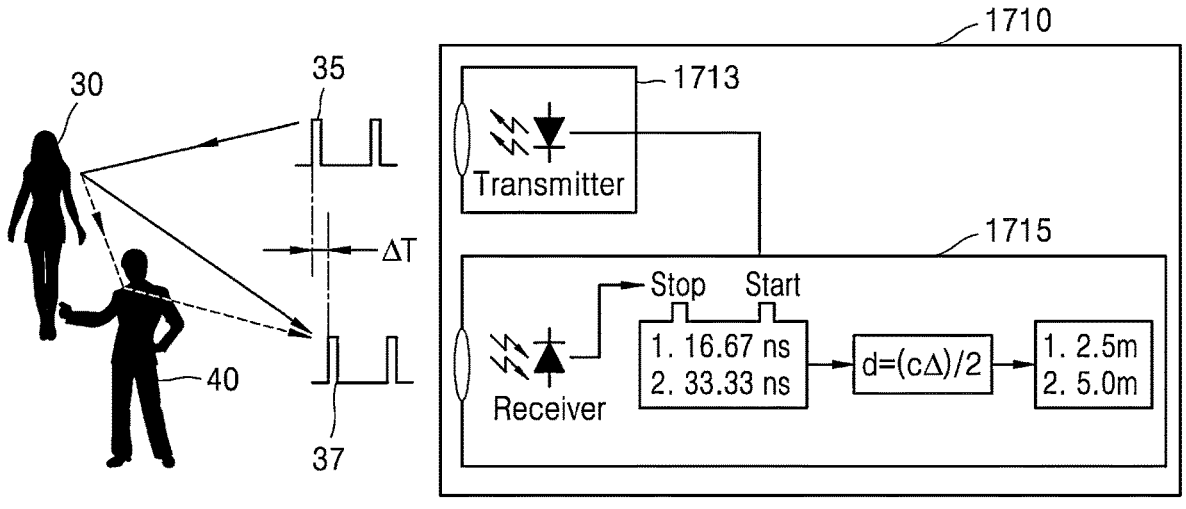
FIG. 3 illustrates an operating method of a TOF LiDAR sensor of a robot, according to an embodiment of the disclosure.

FIG. 3 illustrates an operating method of the TOF LiDAR sensor 1710 of the robot 1000, according to an embodiment of the disclosure.

Referring to FIG. 3, the TOF LiDAR sensor 1710 may include a transmitter 1713 emitting a laser pulse signal 35 and a receiver 1715 receiving a reflection signal 37 of the emitted laser pulse signal 35.

The laser pulse signal 35 may include a single-color laser beam or laser light. Also, the laser pulse signal may denote a cohesive ray intensively extracting energy accumulated in an atom or a molecule and may have a thin and non-spreadable characteristic.

The robot 1000 may calculate a distance to an object based on a flight distance and a flight time of the laser pulse signal 35. For example, when a time ΔT from a time point at which the laser pulse signal 35 is emitted from the transmitter 1713 to a time point at which the emitted laser pulse signal 35 is reflected by a first object 30 and received is 16.67 ns, the flight time 16.67 ns and a speed c of the laser pulse signal 35 may be multiplied by each other to calculate a reciprocating flight distance, and the calculated reciprocating flight distance may be divided by 2 to calculate a distance from the TOF LiDAR sensor 1710 to the first object 30 to be 2.5 m.

In general, as the energy of the laser pulse signal is increased, the laser pulse signal may reach a farther distance, so as to increase a measurable distance and accuracy of distance measurement with respect to a remote object. However, when the energy of the laser pulse signal is increased, accuracy of distance measurement with respect to short-range objects may be decreased due to diffused reflection. For example, referring to FIG. 3, when a laser pulse signal is emitted to the first object 30, a distance to the first object 30 has to be calculated based on only a reflection signal received from the first object 30. But due to diffused reflection, the laser pulse emitted to the first object 30 may be received through a second object 40 after being reflected from the first object 30, and in this case, a flight time may be increased (for example, 33.33 ns in FIG. 3), so that the distance calculated with respect to the first object 30 (for example, 5.0 m in FIG. 3) may be greater than an actual distance (for example, 2.5 m in FIG. 3).

Therefore, the robot 1000 may increase the accuracy of distance calculation by obtaining a distance with respect to a short-range object based on a laser pulse signal having a low energy and obtaining a distance with respect to a remote object based on a laser pulse signal having a high energy.

The robot 1000 may rotate the TOF LiDAR sensor 1710 based on a rotation cycle. Also, by rotating the TOF LiDAR sensor 1710, the robot may obtain a distance to peripheral objects of the robot 1000 and generate a two-dimensional (2D) or three-dimensional (3D) map indicating a position of the objects.

FIG. 4 illustrates a method, performed by the robot 1000, of adjusting an energy of a laser pulse signal, according to an embodiment of the disclosure.

Referring to FIG. 4, the robot 1000 may apply an operation current to the transmitter 1713 of the TOF LiDAR sensor 1710 to control the transmitter 1713 to transmit a laser pulse signal.

The robot 1000 may adjust a pulse energy of the laser pulse signal by adjusting a width of the laser pulse signal. The robot 1000 may adjust the pulse energy of the laser pulse signal by adjusting power of the laser pulse signal. The pulse energy of the laser pulse signal may denote the energy per unit pulse.

Referring to FIG. 4, one pulse of the operation current may correspond to one laser pulse signal emitted by the transmitter 1713 of the TOF LiDAR sensor 1710. Accordingly, one laser pulse may be emitted during one cycle T of the operation current.

According to an embodiment of the disclosure, the robot 1000 may adjust the pulse energy of the laser pulse signal by adjusting a pulse width of the operation current of the TOF LiDAR sensor 1710. To see a graph 41 with respect to pulse width adjusting of FIG. 4, the robot 1000 may reduce a width of the laser pulse signal by reducing a duration, per cycle T, of the operation current of the transmitter 1713 to t2 from t1. As the width of the laser pulse signal is decreased, the pulse energy of the laser pulse signal may also be decreased. When the pulse energy is adjusted by adjusting the pulse width of the operation current, a current value of the operation current may be configured to be a constant value.

According to an embodiment of the disclosure, the robot 1000 may adjust the pulse energy of the laser pulse signal by adjusting the current value of the operation current of the TOF LiDAR sensor 1710. To see a graph 43 with respect to adjusting of pulse power of FIG. 4, the robot 1000 may reduce power of the laser pulse signal by reducing a value of the operation current of the transmitter 1713. As the power of the laser pulse signal is decreased, the pulse energy of the laser pulse signal may also be decreased. When the pulse energy of the laser pulse signal is adjusted by adjusting the current value of the operation current, a pulse width of each pulse of the operation current may be constantly maintained.

FIG. 5 illustrates a method, performed by the robot 1000, of adjusting a laser pulse energy, according to an embodiment of the disclosure.

In operation S510, the robot 1000 may obtain information about a distance between the robot 1000 and peripheral objects of the robot 1000.

For example, the robot 1000 may obtain the information about the distance between the robot 1000 and the peripheral objects of the robot 1000 by outputting a laser pulse signal having a default pulse energy to a peripheral position of the robot 1000.

According to an embodiment, the robot 1000 may define the information about the distance to the peripheral objects, based on each point for obtaining the information about the distance to the peripheral objects. For example, the robot 1000 may define the distance to the peripheral objects according to an angle division.

Also, according to an embodiment of the disclosure, the robot 1000 may define a position of an object on a pre-stored map, by using the information about the distance to the peripheral objects obtained at each point. Based on the position of the object defined on the map, the robot 1000 may define the information about the distance between the robot 1000 and the peripheral objects of the robot 1000.

Also, for example, based on a pre-stored map indicating the positions of the peripheral objects of the robot 1000 and a position of the robot 1000 on the map, the information about the distance between the robot 1000 and the peripheral objects of the robot 1000 may be obtained.

In operation S520, based on the obtained distance information, the robot 1000 may determine to change the energy of a laser pulse signal of the TOF LiDAR sensor to a short-range pulse energy for short-range objects and a remote pulse energy for remote objects.

According to an embodiment of the disclosure, the robot 1000 may adjust the laser pulse signal of the TOF LiDAR sensor 1710 according to a type of a cleaning mode. The cleaning mode may be defined according to a type or an arrangement of an object in a cleaning area.

According to an embodiment of the disclosure, the cleaning mode may include an intensive cleaning mode for cleaning a space around furniture having legs. The furniture having legs may include, for example, tables, chairs, desks, sofas, beds, etc. For example, the robot 1000 may identify a type of at least one of peripheral objects of the robot 1000 as a chair or a table and may start an intensive cleaning mode for intensively cleaning a space between the legs of the chair or the table. Based on the start of the intensive cleaning mode, the robot 1000 may determine to change the energy of the laser pulse signal of the TOF LiDAR sensor to a short-range pulse energy and a remote pulse energy.

Also, according to an embodiment of the disclosure, the cleaning mode may include an obstacle-outline-following mode for following an outline of an obstacle. For example, the robot 1000 may identify an obstacle from among the peripheral objects of the robot 1000 and may start the obstacle-outline-following mode for deviating from a predetermined driving route and following an outline of the identified obstacle. Based on the start of the obstacle-outline-following mode, the robot 1000 may determine to change the energy of the laser pulse signal of the TOF LiDAR sensor to a short-range pulse energy and a remote pulse energy.

Also, according to an embodiment of the disclosure, the robot 1000 may determine the short-range pulse energy based on a size of the cleaning area. For example, the size of the short-range pulse energy may be determined proportionately to the size of the cleaning area.

In operation S530, the robot 1000 may output the laser pulse signal of the TOF LiDAR sensor 1710 by switching a laser pulse signal of the short-range pulse energy and a laser pulse signal of the remote pulse energy during rotation of the TOF LiDAR sensor 1710.

According to an embodiment of the disclosure, the robot 1000 may output a laser pulse signal having the short-range pulse energy during a first rotation cycle of the TOF LiDAR sensor and a laser pulse signal having the remote pulse energy during a second rotation cycle after the first rotation cycle.

According to an embodiment of the disclosure, the robot 1000 may output the laser pulse signal having the short-range pulse energy according to an angular range of short-range objects and the laser pulse signal having the remote pulse energy according to an angular range of remote objects. Based on the information about the distance obtained in operation S510, the robot 1000 may define the information about the distance to the peripheral objects according to an angle division. Based on the information about the distance to the peripheral objects according to the angle division, the robot 1000 may define a section for emitting a short-range pulse energy and a section for emitting a remote pulse energy for each angle division. Based on the defined section for emitting the short-range pulse energy and the defined section for emitting the remote pulse energy, the robot 1000 may generate and output the laser pulse signal having the pulse energy corresponding to each section.

In operation S540, based on reflection signals of the laser pulse signals, received from the peripheral objects, the robot 1000 may correct the information about the distance between the robot 1000 and the peripheral objects of the robot 1000.

For example, the robot 1000 may generate a short-range map based on a reflection signal of the laser pulse signal of the short-range pulse energy. The short-range map may denote a map with respect to the peripheral object of the robot, generated based on the short-range pulse energy. Also, the robot 1000 may generate a remote map based on a reflection signal of the laser pulse signal of the remote pulse energy. The remote map may denote a map with respect to the peripheral object of the robot, generated based on the remote pulse energy. The robot 1000 may generate a map including position information of the peripheral objects of the robot 1000 by combining the short-range map and the remote map.

In operation S550, the robot 1000 may control the driving module to drive based on corrected distance information.

For example, the robot 1000 may update pre-stored map information based on the corrected distance information. The robot 1000 may add position information of recognized objects, to the pre-stored map information. The robot 1000 may configure a driving route based on the updated map information and may control the driving module to drive according to the configured driving route.

Also, for example, the robot 1000 may update the distance to the peripheral objects based on the corrected distance information. The robot 1000 may configure a driving route based on the updated distance to the peripheral objects and may control the driving module to drive according to the configured driving route.

Also, according to an embodiment of the disclosure, the robot 1000 may detect a docking guide signal emitted from a charge station, while the robot 1000 returns to the charge station to dock to the charge station. When the robot 1000 detects the docking guide signal, the robot 1000 may output the laser pulse signal of the TOF LiDAR sensor based on a docking pulse energy, in order to reduce the interference of the docking guide signal. The docking pulse energy may be equal to or less than the short-range pulse energy.

Figure 6A:
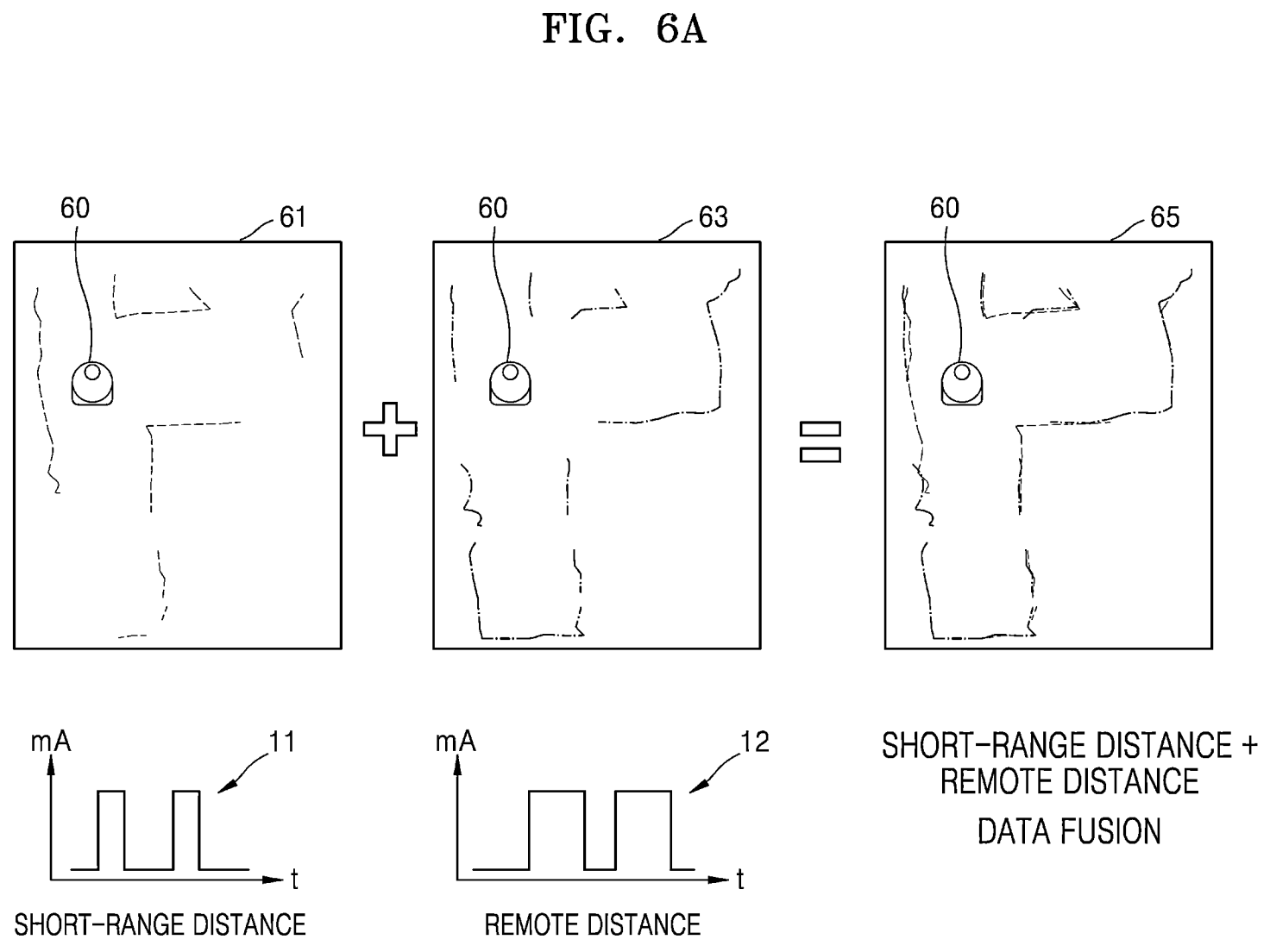
Figure 6B:
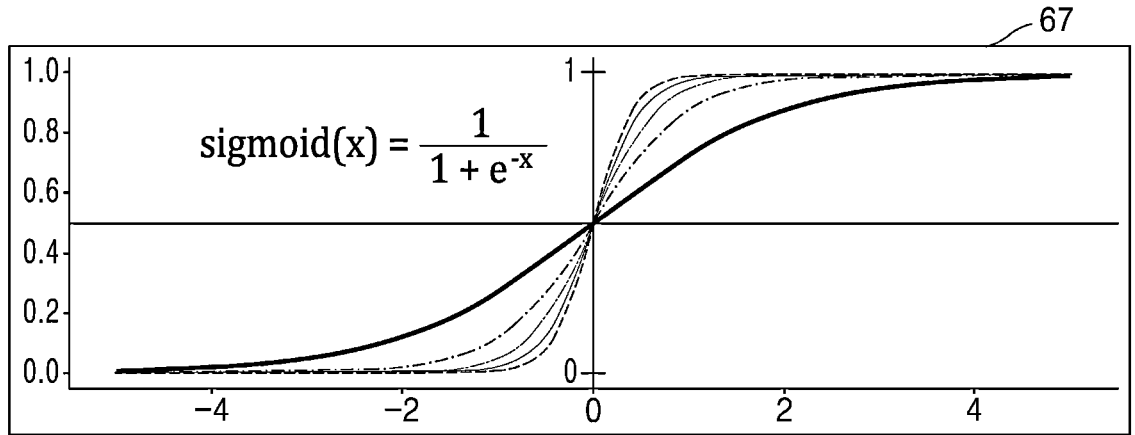

FIGS. 6A and 6B illustrate a method, performed by the robot 1000, of combining distance information obtained based on a short-range pulse energy and distance information obtained based on a remote pulse energy, according to an embodiment of the disclosure.

Referring to FIGS. 6A and 6B, the robot 1000 may output a laser pulse signal based on an operation current 11 of a short-range pulse energy during one rotation cycle of the TOF LiDAR sensor 1710 and may output a laser pulse signal based on an operation current 12 of a remote pulse energy during a next rotation cycle. The robot 1000 may output the laser pulse signal by switching the short-range pulse energy and the remote pulse energy for each rotation cycle. Also, the robot 1000 may output the laser pulse signal by switching the short-range pulse energy and the remote pulse energy once every two rotation cycles.

Referring to FIG. 6A, the robot 1000 may output the laser pulse signal based on the operation current 11 of the short-range pulse energy and may obtain distance information of peripheral objects of the robot 1000 based on a reflection signal. Based on the distance information obtained based on the short-range pulse energy, a short-range map 61 indicating a distance from the robot 1000 to the objects with respect to a position 60 of the robot 1000 may be generated. In this case, the obtained distance information may include not only distance information of short-range objects, but may also partially include distance information of remote objects.

Also, the robot 1000 may output the laser pulse signal based on the operation current 12 of the remote pulse energy and may obtain distance information of remote objects based on a reflection signal. Based on the distance information obtained based on the remote pulse energy, a remote map 63 indicating a distance from the robot 1000 to the objects with respect to the position 60 of the robot 1000 may be generated. In this case, the obtained distance information may include not only distance information of remote objects, but may also partially include distance information of short-range objects.

The robot 1000 may determine a distance to the peripheral objects of the robot 1000 by combining the short-range map

61 with the remote map 63. For example, with respect to objects in a distance within a reference distance, the robot 1000 may select information of the short-range map 61, and with respect to objects in a distance that is greater than or equal to the reference distance, the robot 1000 may select information of the remote map 63, thereby combining the short-range map 61 with the remote map 63.

Also, according to an embodiment of the disclosure, the robot 1000 may combine the distance information of the short-range map 61 with the distance information of the remote map 63 by adding different weights to each other as illustrated in FIG. 6B.

When the distance information based on the short-range pulse energy and the distance information based on the remote pulse energy indicate different values with respect to the same object (that is, the same output angle of the laser pulse signal), the robot 1000 may combine the distance information based on the short-range pulse energy and the distance information based on the remote pulse energy by adding different weights to each other.

Also, when, with respect to the same output angle of the laser pulse signal, distance information based on one pulse energy indicates a distance to an object, and distance information based on the other pulse energy indicates no object, the robot 1000 may determine a distance to an object positioned at the output angle, based on the distance information indicating the distance to the object.

To combine the distance information of the short-range map 61 with the distance information of the remote map 63 by using different weights, the robot 1000 may determine a weight a by using a sigmoid function 67.

$$d = (1 - a) * HighD + a * LowD \qquad \text{(Equation 1)}$$

$$a = \frac{1}{1 + e^{-k(\Delta HighD - \Delta LowD)}} \qquad \text{(Equation 2)}$$

Referring to FIG. 2, the weight a is a result value of the sigmoid function, and a variable of the sigmoid function may be determined based on a difference between the distance information (HighD, distance information based on the remote pulse energy) of the remote map 63 and the distance information (LowD, distance information based on the short-range pulse energy) of the short-range map 61. k of Equation 2 is a distance constant and is predetermined. $\Delta HighD$ of Equation 2 may also denote the distance information of the remote map 63, and $\Delta LowD$ may also denote the distance information of the short-range map 61.

As the difference between the distance information (HighD) of the remote map 63 and the distance information (LowD) of the short-range map 61 with respect to the same object (that is, the same output angle of the laser pulse signal) increases, a value of the weight a is converged to 1. Also, as the difference between the distance information (HighD) of the remote map 63 and the distance information (LowD) of the short-range map 61 with respect to the same object decreases, the value of the weight a is converged to 0.

When the laser pulse signal of the remote pulse energy is output, it is highly possible that diffused reflection may occur from the peripheral objects of the robot 1000, and thus, the distance information (the remote map 63) obtained based on the remote pulse energy may be inaccurate with respect to the short-range objects. Thus, with respect to the short-range objects, the difference between the distance information of the short-range map 61 and the distance information of the remote map 63 may be increased. In this case, the weight a may become close to 1, and thus, the distance information LowD of the short-range map 61 may have a high weight, and the distance information HighD of the remote map 63 may have a low weight.

Referring to Equation 1, the robot 1000 may increase the weight of the distance information of the short-range map 61 and decrease the weight of the distance information of the remote map 63, as the difference between the distance information HighD of the remote map 63 and the distance information LowD of the short-range map 61 is increased, in order to increase the accuracy of a distance d to the short-range objects.

Figure 7:
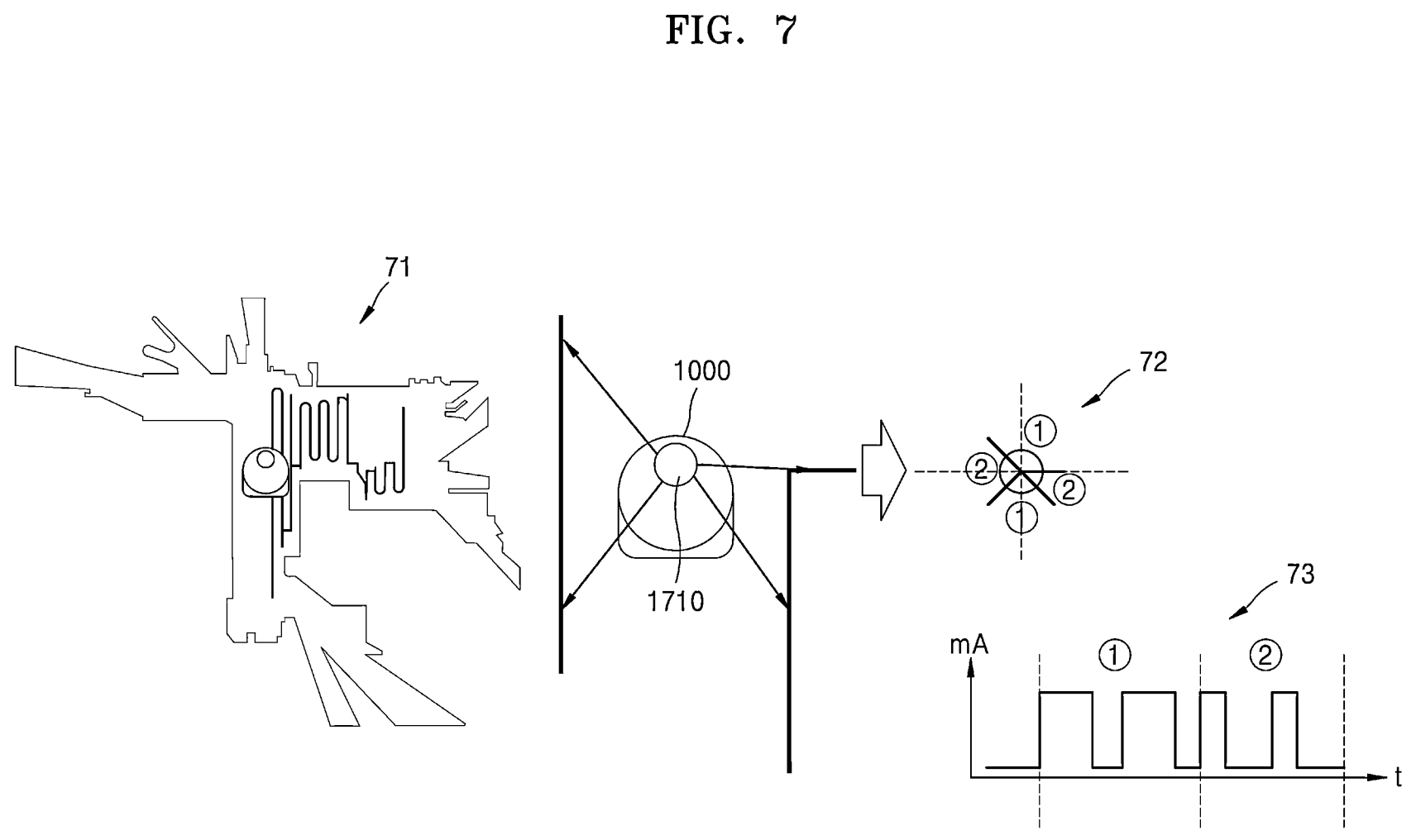

FIG. 7 illustrates a method, performed by the robot 1000, of switching a remote pulse energy and a short-range pulse energy according to an angular range of objects, according to an embodiment of the disclosure.

Referring to FIG. 6, the robot 1000 may determine an angular range of short-range objects and an angular range of remote objects. Also, the robot 1000 may output a laser pulse signal having the short-range pulse energy according to the angular range of the short-range objects and a laser pulse signal having the remote pulse energy according to the angular range of the remote objects.

For example, the robot 1000 may determine an angular range 72 of the objects based on a pre-stored map 71.

In detail, for example, the robot 1000 may determine objects within a reference distance (for example, 2 m) from a current position of the robot 1000 as short-range objects. The robot 1000 may determine an angular range of ② corresponding to a wall based on the current position as the angular range of the short-range objects. Also, the robot 1000 may determine objects in a distance equal to or greater than the reference distance (for example, 2 m) from the current position of the robot 1000 as remote objects. The robot 1000 may determine an angular range of ① at which there is no object within the reference distance based on the current position of the robot 1000 as the angular range of the remote objects.

The robot 1000 may switch the remote pulse energy and the short-range pulse energy based on the determined angular range of the short-range objects and the determined angular range of the remote objects. For example, while the TOF LiDAR sensor 1710 rotates, the robot 1000 may output the laser pulse signal having the short-range pulse energy at the angular range of ②, which is the angular range of the short-range objects, and may determine, based on a reflection signal of the output laser pulse signal, a distance to the short-range objects. Also, while the TOF LiDAR sensor 1710 rotates, the robot 1000 may output the laser pulse signal having the remote pulse energy at the angular range of ①, which is the angular range of the remote objects, and may determine, based on a reflection signal of the output laser pulse signal, a distance to the remote objects.

Referring to a graph 73 of an operation current applied to the transmitter of the TOF LiDAR sensor 1710 of FIG. 7, when a transmission angle of the laser pulse signal of the TOF LiDAR sensor 1710 is in the angular range of ①, the robot 1000 may change a duration time per cycle of the operation current applied to the transmitter of the TOF LiDAR sensor 1710 as a first duration time corresponding to the remote pulse energy. Also, when the transmission angle of the laser pulse signal of the TOF LiDAR sensor 1710 is in the angular range of ②, the robot 1000 may change the duration time per cycle of the operation current applied to the transmitter of the TOF LiDAR sensor 1710 as a second duration time corresponding to the short-range pulse energy. In this case, the second duration time may be less than the first duration time.

Figure 8:
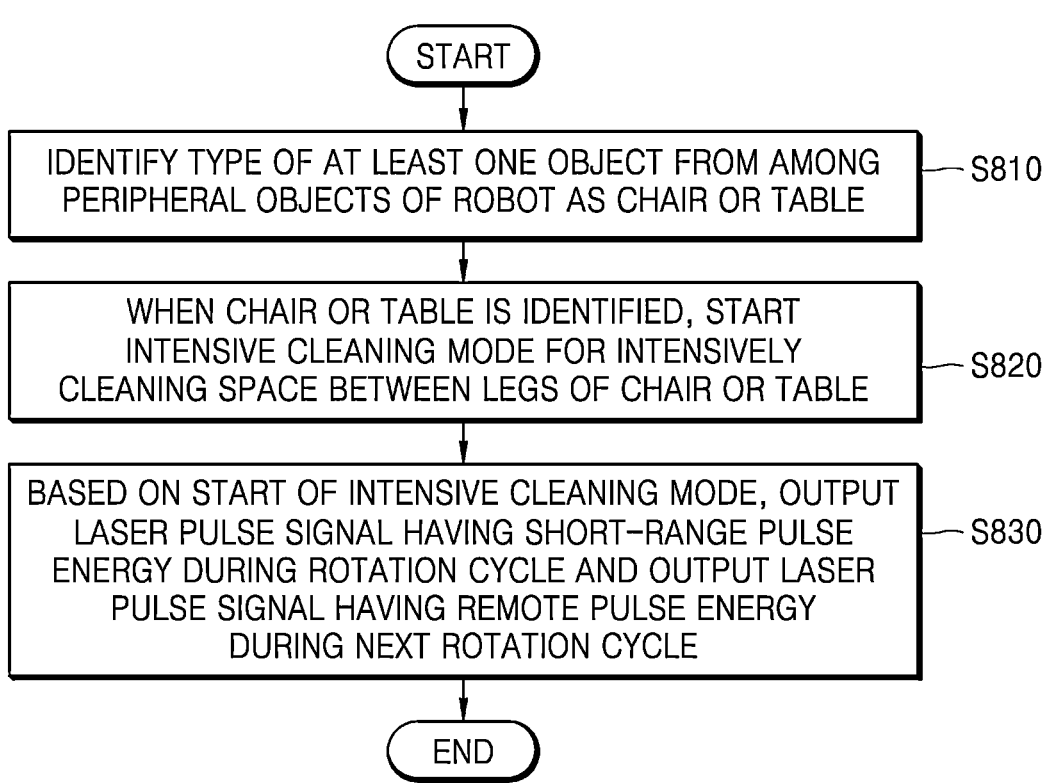
FIG. 8 is a flowchart of a method, performed by a robot, of changing a pulse energy, when the robot cleans a floor of a chair or a table, according to an embodiment of the disclosure.

FIG. 8 is a flowchart of a method of changing a pulse energy in an intensive cleaning mode, according to an embodiment of the disclosure.

According to an embodiment of the disclosure, the robot 1000 may include an intensive cleaning mode for cleaning around furniture having legs.

In operation S810, the robot 1000 may identify a type of at least one from among peripheral objects of the robot 1000 as furniture having legs. For example, the robot 1000 may identify the type of the peripheral object as a chair or a table. Hereinafter, the description will be given mainly based on a case in which the furniture having legs is the chair or the table. However, an embodiment of the disclosure is not limited to the case in which the furniture having legs is the chair or the table. The furniture having legs may correspond to various types of furniture.

The robot 1000 may identify the legs of the chair or the table by using the TOF LiDAR sensor 1710. For example, when cylindrical obstacles are arranged apart from each other by a predetermined distance, the robot 1000 may identify the cylindrical obstacles as the legs of the chair or the table. The robot 1000 may recognize an obstacle having a width equal to or less than a reference width and having an upwardly extending shape as a cylindrical obstacle. The robot 1000 may determine whether cylindrical obstacles are apart from each other by a predetermined distance. When the cylindrical obstacles are apart from each other by a predetermined distance, the robot 1000 may determine the cylindrical obstacles as the legs of the chair or the table. Also, when the cylindrical obstacles are arranged to form square or rectangular vertexes and apart from each other by a predetermined distance, the robot 1000 may identify the cylindrical obstacles as the legs of the chair or the table.

Also, the robot 1000 may photograph a peripheral object of the robot 1000 by using an object recognition sensor (for example, a 2D camera, a 3D camera, etc.) and identify the type of the photographed object as the chair or the table by using an artificial intelligence (AI) module. When the AI module is provided in a server, the robot 1000 may transmit an image of the photographed object to the server and may receive, from the server, information that the type of the object in the photographed image is a chair or a table.

In operation S820, when the robot 1000 identifies the chair or the table, the robot 1000 may start an intensive cleaning mode for intensively cleaning a space between the legs of the chair or the table.

When the intensive cleaning mode is started while the robot 1000 drives along a pre-determined driving route, the robot 1000 may deviate from the driving route and start the intensive cleaning mode for intensively cleaning the space between the legs of the chair or the table. In the intensive cleaning mode, the robot 1000 may perform cleaning by moving in a circular shape along an edge of each leg of the chair or the table.

In operation S830, based on the start of the intensive cleaning mode, the robot 1000 may output a laser pulse signal having a short-range pulse energy during a rotation cycle of the TOD LiDAR sensor 1710 and may output a laser pulse signal having a remote pulse energy during a next rotation cycle.

Based on the start of the intensive cleaning mode when the robot 1000 drives along the driving route by outputting a laser pulse signal of a default pulse energy, the robot 1000 may determine to change the energy of the laser pulse signal of the TOF LiDAR sensor 1710 to the short-range pulse energy and the remote pulse energy.

In this case, the short-range pulse energy may be less than the default pulse energy.

According to an embodiment of the disclosure, the robot 1000 may store the short-range pulse energy (for example, a duration time per cycle or power of an operation current applied to the transmitter of the TOF LiDAR sensor 1710) pre-determined according to the intensive cleaning mode. For example, the robot 1000 may store the short-range pulse energy corresponding to the intensive cleaning mode, the short-range pulse energy corresponding to the intensive cleaning mode being different from a short-range pulse energy used in a general cleaning mode.

Also, according to an embodiment of the disclosure, the robot 1000 may determine the short-range pulse energy proportionately to a size of an intensive cleaning area. For example, based on a position of the legs of the chair or the table, the robot 1000 may determine a floor area occupied by the chair or the table as the size of the intensive cleaning area. Also, the robot 1000 may determine the short-range pulse energy proportionately to the size of the intensive cleaning area. For example, when the intensive cleaning area is determined to be a square area having a horizontal length of 50 cm and a vertical length of 50 cm, the robot 1000 may determine a pulse energy corresponding to a radius of 1 m as the short-range pulse energy. Also, for example, when the intensive cleaning area is determined to be a square area having a horizontal length of 1 m and a vertical length of 1 m, the robot 1000 may determine a pulse energy corresponding to a radius of 1.5 m as the short-range pulse energy.

Further, the remote pulse energy may be equal to the default pulse energy or may be greater than the default pulse energy.

The robot 1000 may drive by switching the laser pulse signal of the short-range pulse energy and the laser pulse signal of the remote pulse energy for each rotation cycle of the TOF LiDAR sensor 1710.

Also, when the intensive cleaning mode is ended, and the robot 1000 drives along the driving route again, the robot 1000 may output the laser pulse signal based on the default pulse energy again.

Because the robot 1000 may have to clean the space between the legs of the chair or the table by passing therethrough in the intensive cleaning mode, a distance to the legs of the chair or the table and a position of the legs on a map may be important. Also, because a distance between the legs of the chair or the table is small, it is highly probable that diffused reflection may be caused by the legs when a pulse energy of the laser pulse signal is high in the intensive cleaning mode. Therefore, the robot 1000 may output the laser pulse signal of the short-range pulse energy in the intensive cleaning mode to accurately calculate the distance to the legs and the position of the legs on the map. Also, the robot 1000 may switch the short-range pulse energy and the remote pulse energy for each rotation cycle of the TOF LiDAR sensor 1710 to accurately calculate not only the distance to the legs, but also a distance to peripheral objects of the robot 1000.

According to an embodiment of the disclosure, in the intensive cleaning mode, the robot 1000 may not switch the short-range pulse energy and the remote pulse energy for each rotation cycle of the TOF LiDAR sensor 1710 and may output only the laser pulse signal of the short-range pulse energy. For example, when the intensive cleaning mode is started while the robot 1000 drives along a driving route by outputting a laser pulse signal of the default pulse energy, the robot 1000 may output a laser pulse signal based on the short-range pulse energy less than the default pulse energy. Also, when the intensive cleaning mode is ended, the robot 1000 may output the laser pulse signal based on the default pulse energy again.

Figure 9:
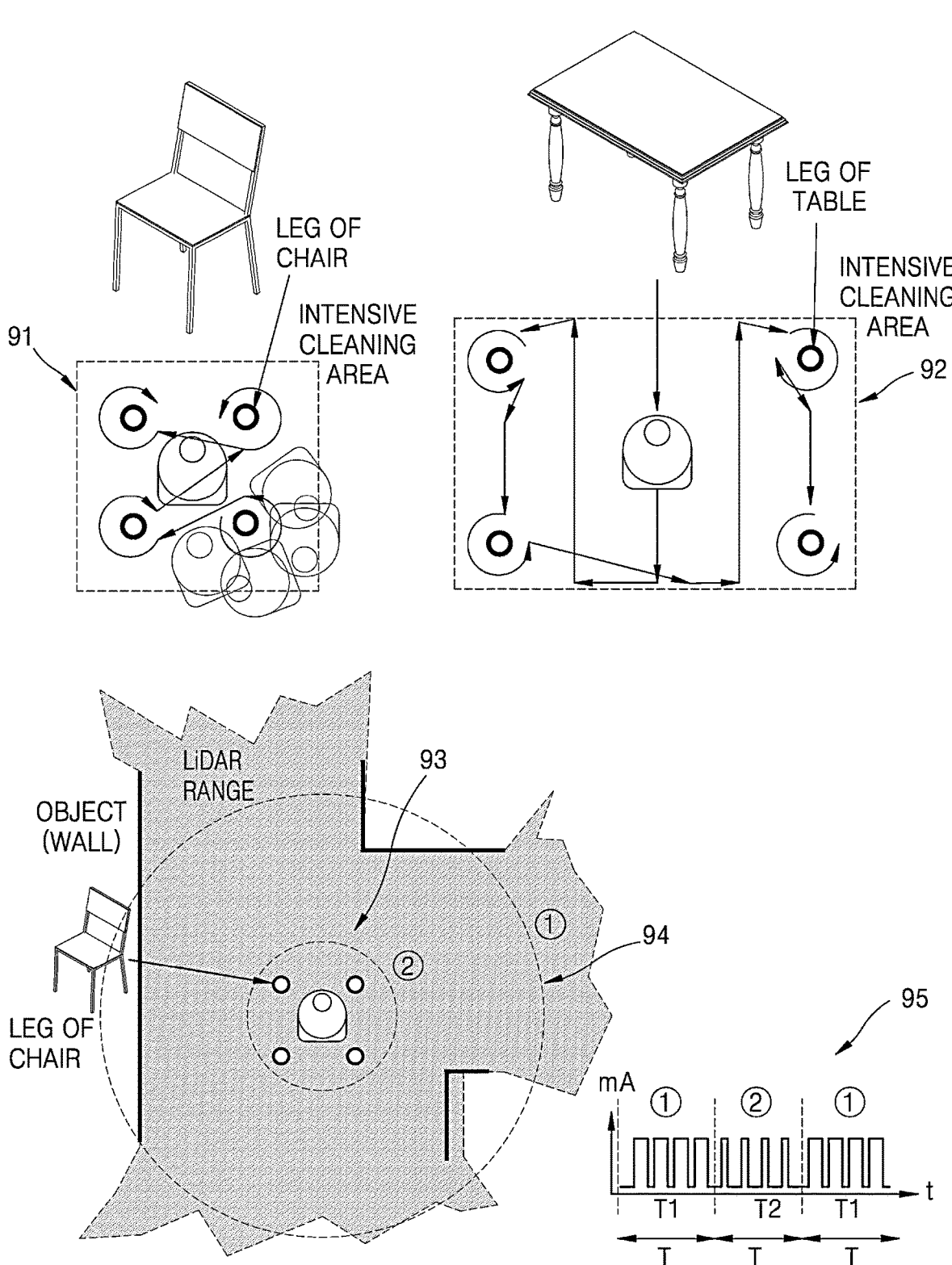
FIG. 9 illustrates a method, performed by a robot, of changing a pulse energy, when the robot cleans a floor of a chair or a table.

FIG. 9 illustrates a method, performed by the robot 1000, of changing a pulse energy, when the robot cleans a floor beneath a chair or a table.

Referring to FIG. 9, the robot 1000 may output a laser pulse signal by switching the short-range pulse energy and the remote pulse energy for each rotation cycle of the TOF LiDAR sensor 1710, in an intensive cleaning mode for intensively cleaning a space between legs of the chair or the table.

As illustrated in an intensive cleaning route 91 of the chair and an intensive cleaning route 92 of the table in FIG. 9, when the intensive cleaning mode is started, the robot 1000 may deviate from the driving route and may clean by driving between the space of the legs of the chair or the table. In the intensive cleaning mode, the robot 1000 may have to drive by following each leg or passing through the space between the legs, and thus, it is important to accurately calculate a distance to the legs and a position of the legs on a map in order not to collide with the legs.

When the intensive cleaning mode is started while the robot 1000 drives along the driving route based on the default pulse energy, the robot 1000 may switch the short-range pulse energy and the remote pulse energy for each rotation cycle of the TOF LiDAR sensor 1710.

For example, the robot 1000 may determine a pulse energy corresponding to a pre-determined radius of 2 m to be the short-range pulse energy and may determine a pulse energy corresponding to a radius of 6 m to be the remote pulse energy. Also, for example, the robot 1000 may determine the short-range pulse energy based on a size of the intensive cleaning area. When the intensive cleaning area is a circular area of a radius of 1 m, the robot 1000 may determine a pulse energy corresponding to a radius of 1.5 m to be the short-range pulse energy.

Referring to a graph 95 of an operation current of the transmitter of the TOF LiDAR sensor 1710, the robot 1000 may output a laser pulse signal of the remote pulse energy during one rotation cycle T of the TOF LiDAR sensor 1710 and output a laser pulse signal of the short-range pulse energy during a next rotation cycle. For example, as illustrated in FIG. 9, the robot 1000 may output the laser pulse signal of the remote pulse energy by setting a duration time per cycle of the operation current as T1 during one rotation cycle of the TOF LiDAR sensor 1710. Also, the robot 1000 may output the laser pulse signal of the short-range pulse energy by changing the duration time per cycle of the operation current as T2 during a next rotation cycle of the TOF LiDAR sensor 1710.

The robot 1000 may determine a position of remote objects 94 based on the remote pulse energy and may determine a position of short-range objects 93 based on the short-range pulse energy.

Figure 10:
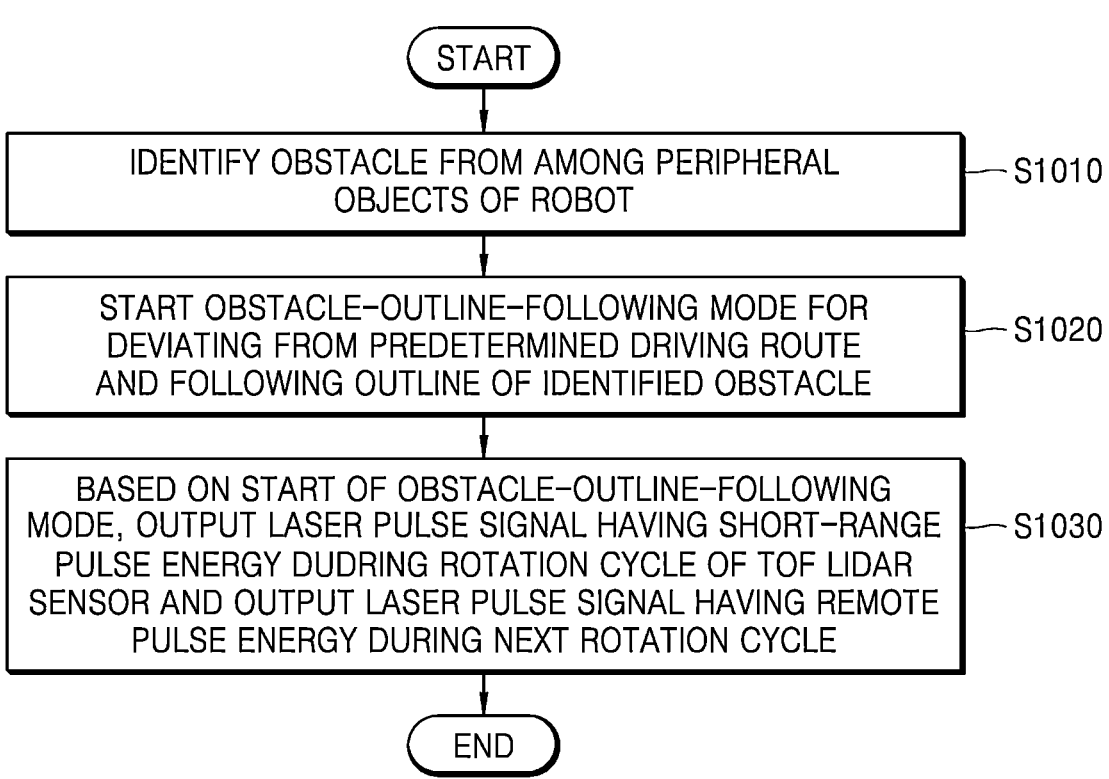
FIG. 10 is a flowchart of a method, performed by a robot, of changing a pulse energy, when the robot follows an outline of an obstacle, according to an embodiment of the disclosure.

FIG. 10 is a flowchart of a method, performed by the robot 1000, of changing a pulse energy, when the robot 1000 follows an outline of an obstacle, according to an embodiment of the disclosure.

In operation S1010, the robot 1000 may identify an obstacle from among peripheral objects of the robot 1000.

For example, the robot 1000 may photograph the peripheral objects of the robot 1000 by using a camera or an object recognition sensor and may identify an obstacle from among the photographed objects by using an AI module.

In operation S1020, the robot 1000 may start an obstacle-outline-following mode for deviating from a predetermined driving route and following an outline of the identified obstacle.

When the outline following mode is started while the robot 1000 drives along the pre-determined driving route, the robot 1000 may start the obstacle-outline-following mode for deviating from the driving route and cleaning by following the outline of the identified obstacle.

In operation S1030, based on the start of the obstacle-outline-following mode, the robot 1000 may output a laser pulse signal having a short-range pulse energy during a rotation cycle of the TOD LiDAR sensor 1710 and may output a laser pulse signal having a remote pulse energy during a next rotation cycle.

When the obstacle-outline-following mode is started while the robot 1000 drives along the driving route by outputting a laser pulse signal of a default pulse energy, the robot 1000 may determine to change the energy of the laser pulse signal of the TOF LiDAR sensor 1710 to be the short-range pulse energy and the remote pulse energy.

In this case, the short-range pulse energy may be less than the default pulse energy. Also, the short-range pulse energy may be pre-determined to correspond to the obstacle-outline-following mode. For example, the robot 1000 may pre-store the short-range pulse energy corresponding to the obstacle-outline-following mode, which is different from the short-range pulse energy used in a general cleaning mode. The remote pulse energy may be equal to the default pulse energy or may be greater than the default pulse energy.

The robot 1000 may drive by switching the laser pulse signal of the short-range pulse energy and the laser pulse signal of the remote pulse energy for each rotation cycle of the TOF LiDAR sensor 1710.

Also, when the outline following mode is ended, and the robot 1000 drives along the driving route again, the robot 1000 may output the laser pulse signal based on the default pulse energy again.

When the obstacle is an object that may cause a problem when touched by the robot 1000, such as a cup, a water bottle, dog poop, a towel, a wire, or a flowerpot, it is important that the robot 1000 drives by being apart from the obstacle by a predetermined distance. However, it is also important to clean a space near the obstacle, and thus, it is required to accurately calculate a distance to the obstacle or a position of the obstacle on a map.

Therefore, the robot 1000 may output the laser pulse signal of the short-range pulse energy in the obstacle-outline-following mode, and thus, may accurately calculate the distance to the obstacle and the position of the obstacle on the map.

According to an embodiment of the disclosure, in the obstacle-outline-following mode, the robot 1000 may not switch the short-range pulse energy and the remote pulse energy for each rotation cycle of the TOF LiDAR sensor 1710 and may output only the laser pulse signal of the short-range pulse energy.

Figure 11:
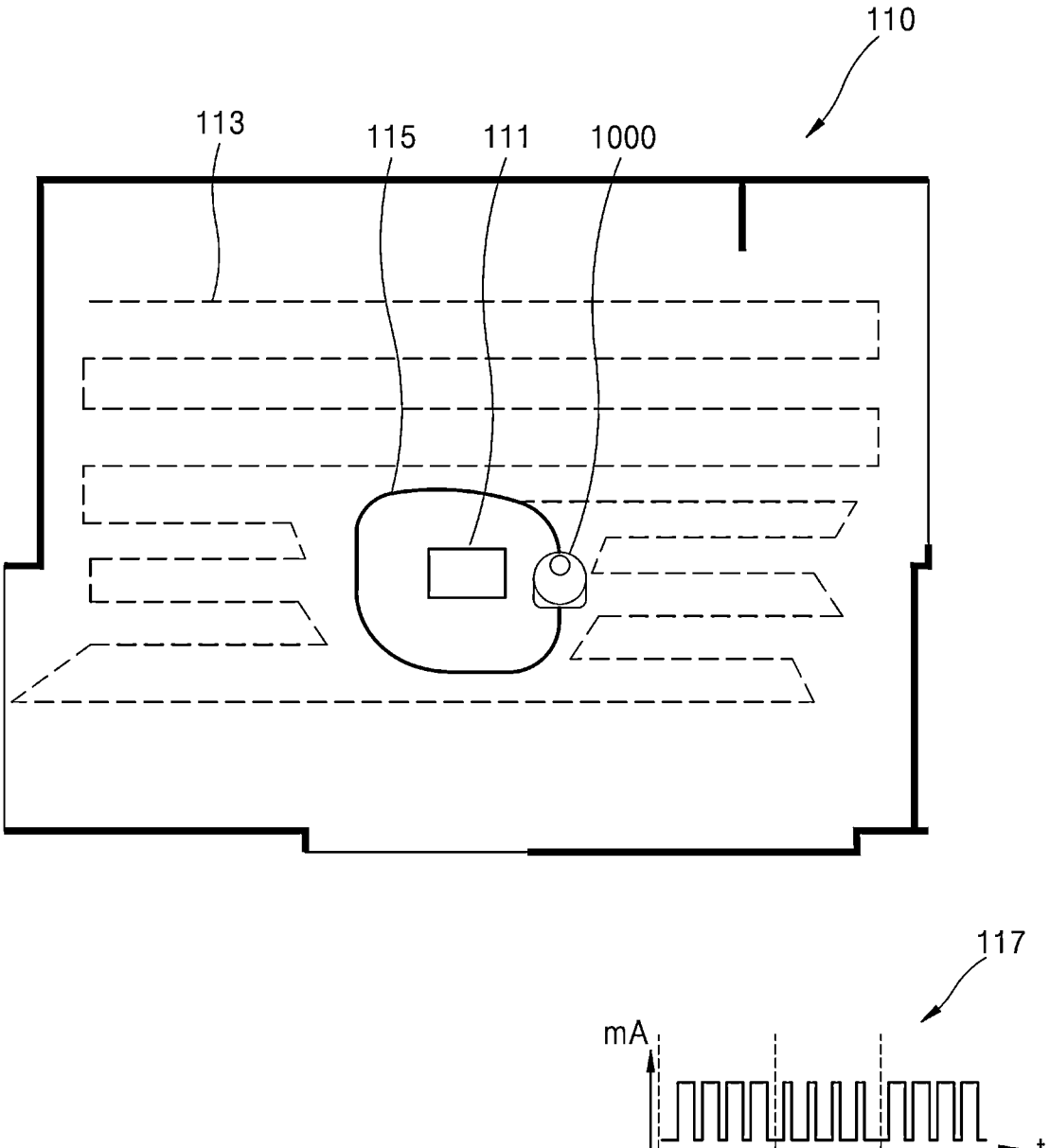
FIG. 11 illustrates a method, performed by a robot, of changing a pulse energy, when the robot follows an outline of an obstacle, according to an embodiment of the disclosure.

FIG. 11 illustrates a method, performed by the robot 1000, of changing a pulse energy, when the robot follows an outline of an obstacle, according to an embodiment of the disclosure.

Referring to FIG. 11, in the obstacle-outline-following mode, the robot 1000 may output the laser pulse signal by switching the short-range pulse energy and the remote pulse energy for each rotation cycle of the TOF LiDAR sensor 1710.

As illustrated in FIG. 11, when an obstacle 111 on a driving route 113 is identified while the robot 1000 drives along the driving route 113 of a cleaning area 110, the robot 1000 may start the obstacle-outline-following mode for driving along an outline 115 of the obstacle 111 in a pre-determined distance from the obstacle 111.

When the obstacle-outline-following mode is started while the robot 1000 drives along the driving route 113 based on a default pulse energy, the robot 1000 may switch the short-range pulse energy and the remote pulse energy for each rotation cycle of the TOF LiDAR sensor 1710.

For example, the robot 1000 may output a laser pulse signal during a rotation cycle of the TOF LiDAR sensor 1710, based on a pulse energy corresponding to a radius of 1 m, stored as the short-range pulse energy of the obstacle-outline-following mode. Also, the robot 1000 may output a laser pulse signal during a next rotation cycle, based on a pulse energy corresponding to a radius of 6 m, stored as the remote pulse energy of the obstacle-outline-following mode.

Referring to a graph 117 of an operation current of the transmitter of the TOF LiDAR sensor 1710, the robot 1000 may output the laser pulse signal of the remote pulse energy during one rotation cycle T1 of the TOF LiDAR sensor 1710 and may output the laser pulse signal of the short-range pulse energy during a next rotation cycle T2 of the TOF LiDAR sensor 1710.

The robot 1000 may determine a position of remote objects based on the remote pulse energy and a position of short-range objects including the obstacle based on the short-range pulse energy.

Figure 12:
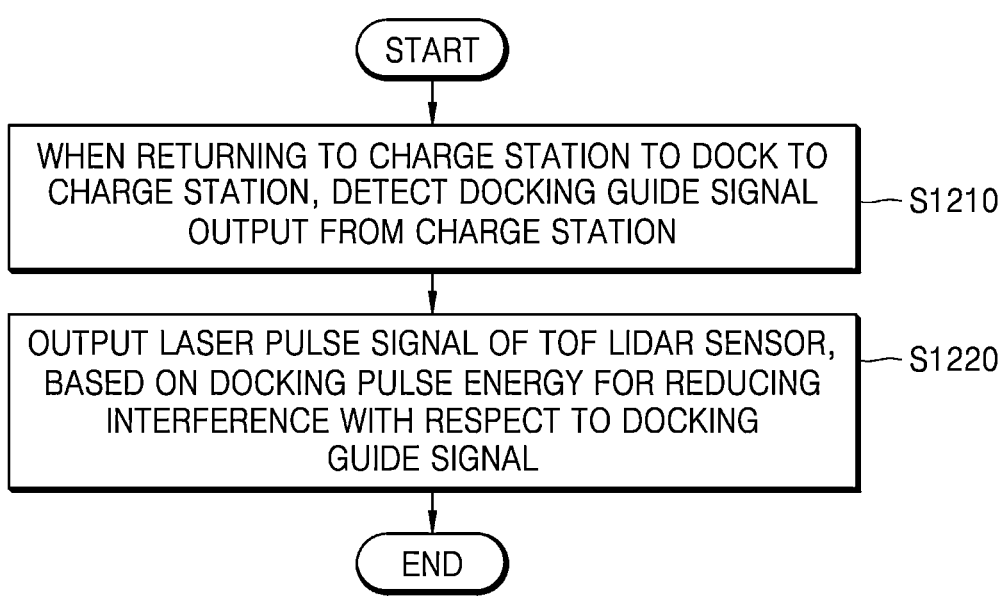
FIG. 12 is a flowchart of a method, performed by a robot, of changing a pulse energy, when the robot returns to a charge station, according to an embodiment of the disclosure.

FIG. 12 is a flowchart of a method, performed by the robot 1000, of changing a pulse energy, when the robot 1000 returns to a charge station, according to an embodiment of the disclosure.

In operation S1210, while the robot 1000 returns to a charge station to dock to the charge station, the robot 1000 may detect a docking guide signal emitted from the charge station. When the robot 1000 detects the docking guide signal, the robot 1000 may operate in a docking mode.

When the robot 1000 ends the cleaning, or a battery charge amount is equal to or less than a reference amount, the robot 1000 may enter into a charge returning mode for returning to the charge station. When the robot 1000 enters into the charge returning mode, the robot 1000 may drive toward the charge station, which is a starting point of cleaning.

As the robot 1000 approaches the charge station, the robot 1000 may detect the docking guide signal output by the charge station. The docking guide signal may be an infrared signal and may have a wavelength band substantially the same as a wavelength band of the laser pulse signal emitted by the TOF LiDAR sensor 1710. For example, the docking guide signal may have a wavelength band of 700 to 1000 nm. When the docking guide signal is detected, the robot 1000 may enter into the docking mode.

In operation S1220, the robot 1000 may output a laser pulse of the TOF LiDAR sensor 1710, based on a docking pulse energy for reducing interference with respect to the docking guide signal.

For example, when the robot 1000 detects the docking guide signal output by the charge station while the robot 1000 outputs the laser pulse signal of the default pulse energy, the robot 1000 may output a laser pulse signal of the docking pulse energy for reducing interference with respect to the docking guide signal.

The docking pulse energy may be less than the default pulse energy. Also, the docking pulse energy may be pre-stored to correspond to the docking mode.

Also, for example, when the docking guide signal output by the charge station is detected while the robot 1000 outputs the laser pulse signal by switching the short-range pulse energy and the remote pulse energy, the robot 1000 may output the laser pulse signal of the docking pulse energy for reducing interference with respect to the docking guide signal. The docking pulse energy may have the same energy value as the short-range pulse energy or a less energy value than the short-range pulse energy.

Therefore, the docking guide signal may be received by the robot 1000 without interference of the laser pulse signal, and thus, the robot 1000 may accurately and rapidly detect a position of the charge station.

Because the wavelength band of the laser pulse signal and the wavelength band of the docking guide signal are substantially the same as each other, the docking guide signal may be interfered by the laser pulse signal or a reflection signal of the laser pulse signal. When the docking guide signal is interfered, the robot 1000 may not detect the position of the charge station and may take a long time to dock to the charge station. In the case of a docking mode for approaching the charge station, it is not required to identify an accurate position of a remote object, and thus, a pulse energy of the laser pulse signal may be reduced to prevent the interference to the docking guide signal.

Figure 13:
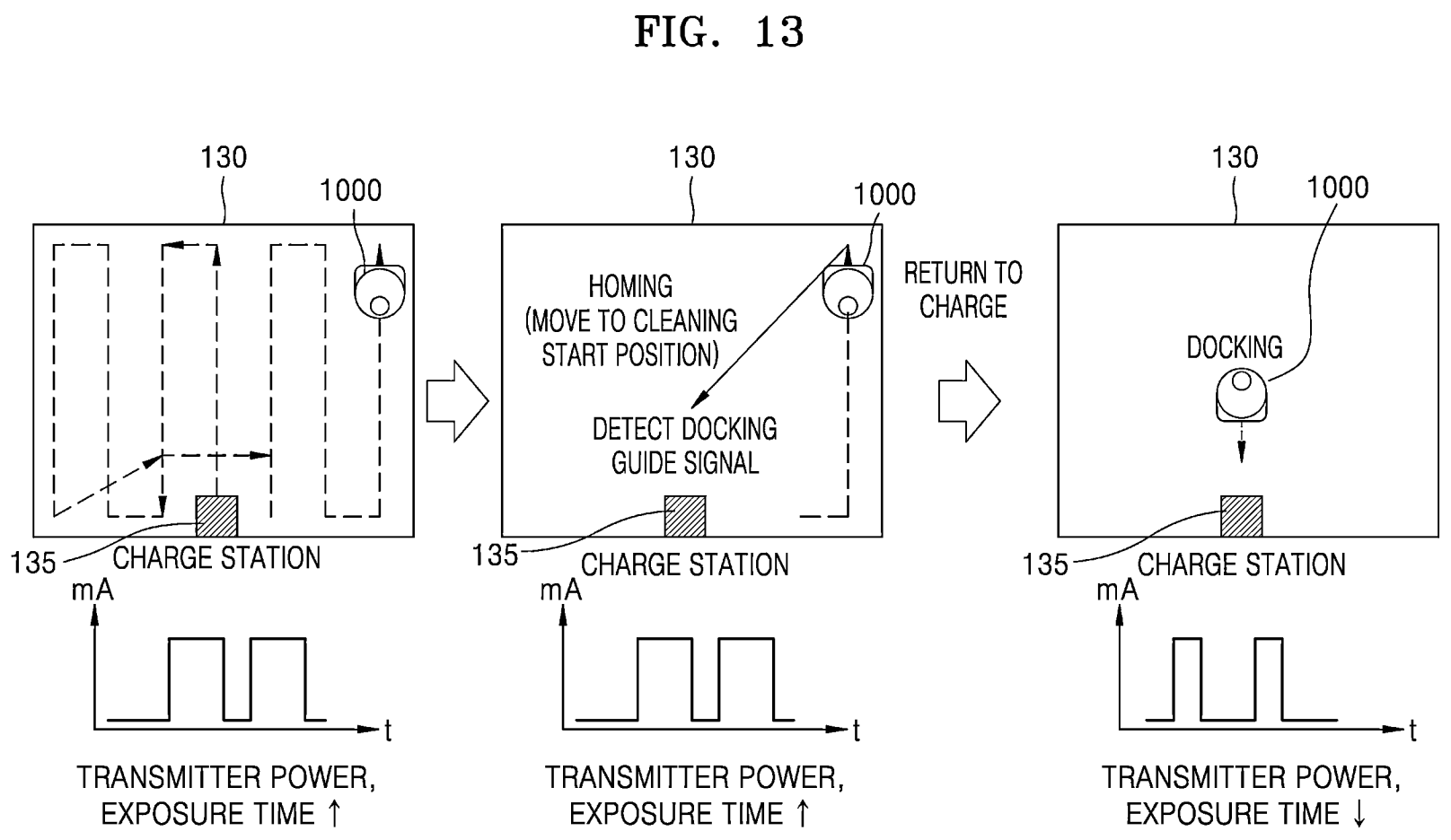

FIG. 13 illustrates a method, performed by the robot 1000, of changing a pulse energy, when the robot 1000 returns to a charge station 135, according to an embodiment of the disclosure.

Referring to FIG. 13, the robot 1000 docked to the charge station 135 may leave the charge station 135 and start driving along a driving route in a cleaning area 130. While the robot 100 drives along the driving route, the robot 1000 may output a laser pulse signal based on a default pulse energy.

When the cleaning is ended, the robot 1000 may move to the charge station 135, which is a cleaning start position, in order to dock to the charge station 135 again. The robot 1000 may start driving toward the cleaning start position, based on a cleaning start position pre-stored on a map. While the robot 1000 drives toward the cleaning start position, the robot 1000 may output the laser pulse signal based on the default pulse energy.

When the robot 1000 approaches the charge station 135, the robot 1000 may detect a docking guide signal emitted from the charge station. Based on the detection of the docking guide signal, the robot 1000 may output a laser pulse signal of a docking pulse energy for reducing interference with respect to the docking guide signal.

The docking pulse energy may have a lower value than the default pulse energy. Referring to graphs of an operation current of the transmitter of the TOF LiDAR sensor 1710 of FIG. 13, when the robot 1000 is driving or is moving to the cleaning start position, the robot 1000 may output a laser pulse signal by setting a duration time per cycle of the operation current as a first duration time. Also, based on the detection of the docking guide signal, the robot 1000 may change the duration time per cycle of the operation current to a second duration time, which is less than the first duration time, and may output the laser pulse signal based on the second duration time until the docking is completed. For example, the second duration time may be ½ of the first duration time.

Figure 14:
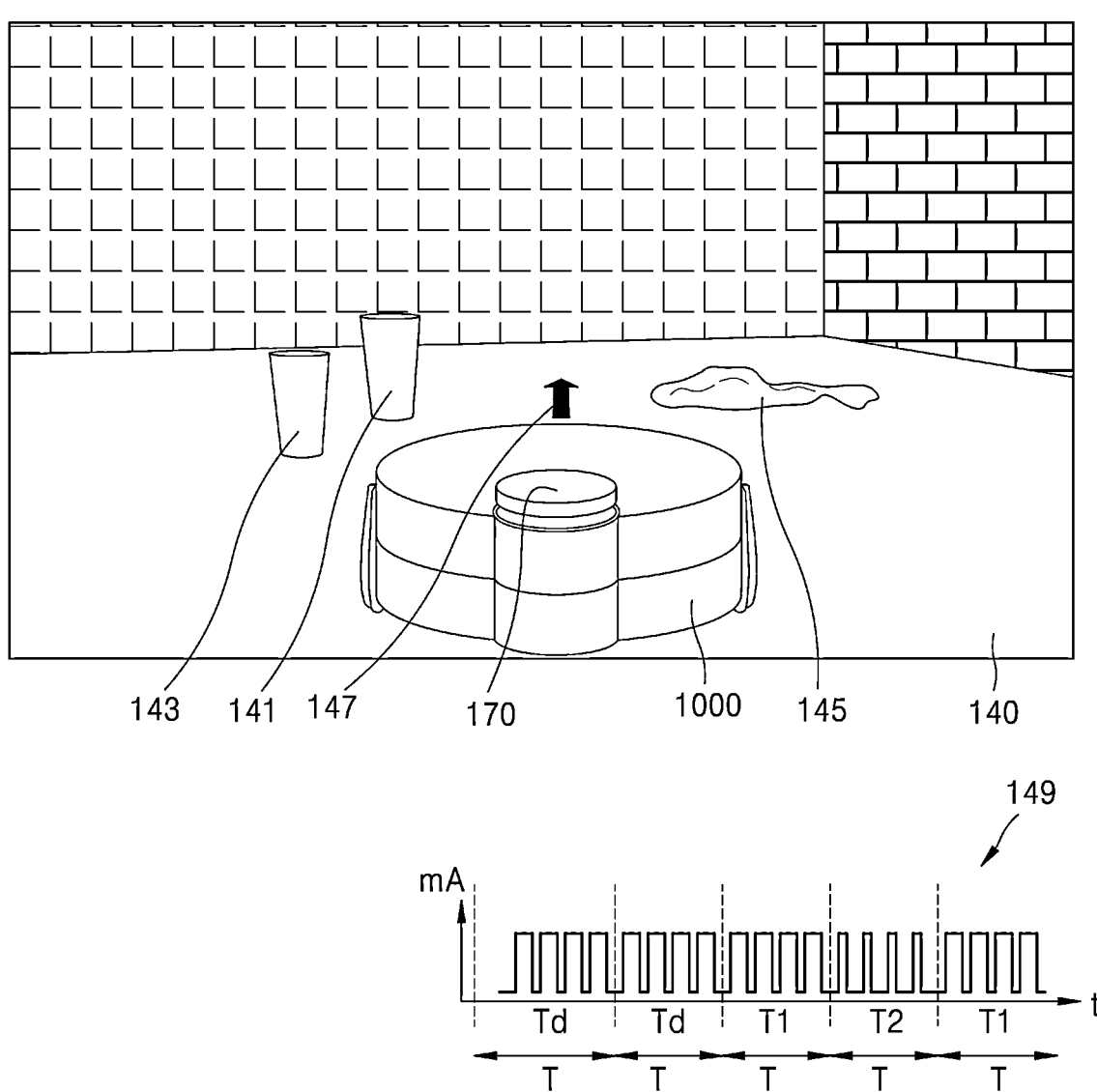
FIG. 14 illustrates a method, performed by a robot, of changing a pulse energy of a laser pulse signal, when the robot identifies an obstacle located in a diving route direction, according to an embodiment of the disclosure.

FIG. 14 illustrates a method, performed by the robot 1000, of changing a pulse energy of a laser pulse signal, when the robot identifies an obstacle positioned in a diving route direction, according to an embodiment of the disclosure.

Referring to FIG. 14, the robot 1000 may photograph a front space by using an object recognition sensor and identify a position, the number, and types of objects in the photographed image.

When the robot 1000 identifies an obstacle in a driving route direction while the robot 1000 drives along a cleaning area by outputting a laser pulse signal of a default pulse energy, the robot 1000 may drive by switching a short-range pulse energy and a remote pulse energy for each rotation cycle of the TOF LiDAR sensor.

The obstacle positioned in the driving route direction may include not only an obstacle positioned on the driving route, but also an obstacle positioned within a reference distance from the driving route.

As illustrated in FIG. 14, when a cup and a towel within a reference distance from a driving route 147 are detected while the robot 1000 drives along a cleaning area 140 based on a default pulse energy (corresponding to a pulse width Td of an operation current graph 149 of FIG. 14), the robot 1000 may drive by switching a short-range pulse energy (corresponding to a pulse width T2 of the operation current graph 149 of FIG. 14) and a remote pulse energy (corresponding to a pulse width T1 of the operation current graph 149 of FIG. 14). Also, when no obstacle within the reference distance from the driving route 147 is detected while the robot 1000 continually drives, the robot 1000 may change the energy of the laser pulse signal to a default pulse energy again.

Thus, even when the robot 1000 approaches the obstacle, the robot 1000 may accurately calculate a distance to the obstacle to efficiently change the driving route.

Also, the robot 1000 may change the pulse energy of the laser pulse signal only when a distance between obstacles is less than or equal to a reference distance, rather than changing the pulse energy of the laser pulse signal when there is simply an obstacle in a driving route direction.

For example, as illustrated in FIG. 14, when two cups and a towel within the reference distance from the driving route 147 are detected, and the distance between the two cups is determined to be less than or equal to the reference distance, the default pulse energy of the laser pulse signal may be changed to the short-range pulse energy and the remote pulse energy that are switched.

When the distance between the obstacles decreases, the probability of occurrence of diffused reflection may increase, and thus, when the distance between the obstacles is less than or equal to the reference distance, the robot 1000 may output a laser pulse signal of the short-range pulse energy, which is less than the default pulse energy. Thus, the robot 1000 may accurately calculate the distance to the obstacle and the position of the obstacle.

Figure 15:
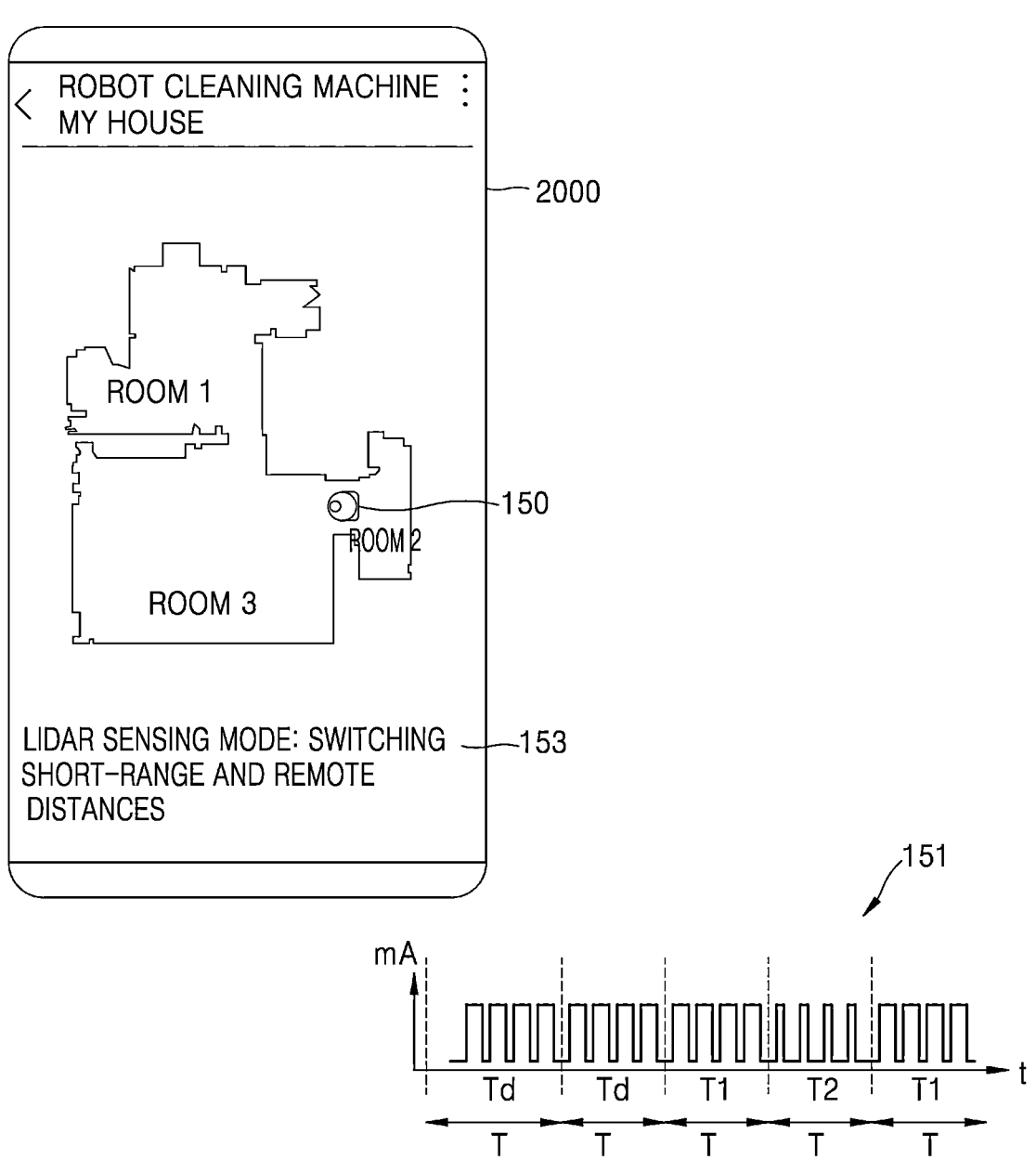
FIG. 15 illustrates a method, performed by a robot, of changing a pulse energy of a laser pulse signal, according to a size of a cleaning area, according to an embodiment of the disclosure.

FIG. 15 illustrates a method, performed by the robot 1000, of changing a pulse energy of a laser pulse signal, according to a size of a cleaning area, according to an embodiment of the disclosure.

Referring to FIG. 15, the robot 1000 may change the pulse energy of the laser pulse signal according to the size of the cleaning area. Also, the robot 1000 may determine the pulse energy of the laser pulse signal according to the size of the cleaning area.

For example, when the robot 1000 enters into a living room area, after the robot 1000 cleans a room area based on a default pulse energy, the robot 1000 may output a laser pulse signal of a short-range pulse energy which is less than the default pulse energy and a laser pulse signal of a remote pulse energy which is greater than the default pulse energy by switching the laser pulse signal of the short-range pulse energy and the laser pulse signal of the remote pulse energy. Also, as another example, when the robot 1000 enters into a small room area, after the robot 1000 cleans the living room area based on the default pulse energy, the robot 1000 may output the laser pulse signal of the short-range pulse energy which is less than the default pulse energy and a laser pulse signal of the default pulse energy by switching the laser pulse signal of the short-range pulse energy and the laser pulse signal of the default pulse energy.

For example, referring to FIG. 15, when the robot 1000 enters into room 2 after cleaning room 3, as the robot 1000 drives along room 3 based on the default pulse energy, the robot 1000 may determine a size of room 2 based on pre-stored map information. Also, when the size of room 2 is within a reference size, the robot 1000 may output a laser pulse signal by switching the short-range pulse energy and the remote pulse energy.

In this case, the short-range pulse energy (corresponding to a pulse width T2 of an operation current graph 151 of FIG. 15) may be less than the default pulse energy (corresponding to a pulse width Td of the operation current graph 151 of FIG. 15). Also, the robot 1000 may determine the short-range pulse energy to be proportionate to the size of the cleaning area. Also, the remote pulse energy (corresponding to a pulse width T1 of the operation current graph 151 of FIG. 15) may be the same as the default pulse energy.

According to an embodiment of the disclosure, the robot 1000 may communicate with a device 2000, and the device 2000 may provide information related to an operation of the robot 1000, a graphic user interface (GUI), etc. The device 2000 may store and execute a predetermined application for providing the information with respect to the robot 1000 and controlling the robot 1000. The device 2000 may communicate with the robot 1000 through a server (not shown) or may directly communicate with the robot 1000 through near-field communication. The device 2000 may correspond to, for example, a communication terminal, a mobile device, a smartphone, a table personal computer (PC), a wearable device, or the like.

The device 2000 may display an image 150 indicating a position of the robot 1000 on a map, together with map information. Also, the device 2000 may display a phrase 153 or an image indicating a current sensing mode of the TOF LiDAR sensor.

Figure 16:
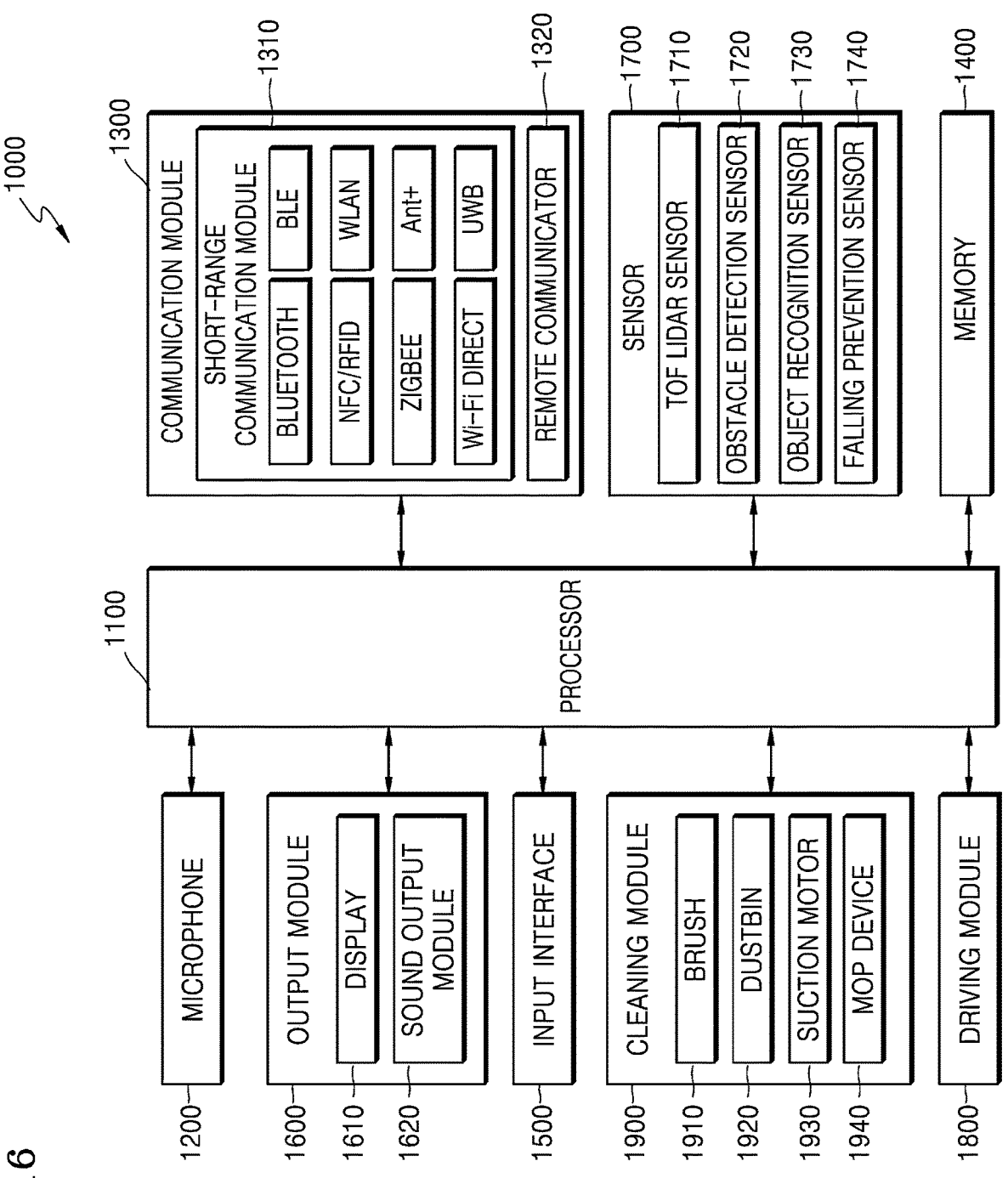
FIG. 16 is a block diagram of a robot according to an embodiment of the disclosure.

FIG. 16 is a block diagram of the robot 1000 according to an embodiment of the disclosure.

Referring to FIG. 16, the robot 1000 may include the processor 1100, a microphone 1200, a communication module 1300, the memory 1400, an input interface 1500, an output module 1600, a sensor 1700, the driving module 1800, and a cleaning module 1900. For the same components as the components illustrated in FIG. 2, the same reference numerals are used.

Not all illustrated components are essential components of the robot 1000. The robot 1000 may be realized by including more or less components than the components illustrated in FIG. 16.

The output module 1600 may include a sound output module 1620 and a display 1610.

The sound output module 1620 may output a sound signal to the outside of the robot 1000. The sound output module 1620 may include, for example, a speaker or a receiver. The speaker may be used for a general purpose, such as multimedia reproduction or recording reproduction.

The display 1610 may output, through a display panel (not shown), image data image-processed by an image processor (not shown), according to control by the processor 1100. The display panel (not shown) may include at least one of a liquid crystal display, a thin-film transistor liquid crystal display, an organic light-emitting diode, a flexible display, a 3D display, or an electrophoretic display.

The input interface 1500 may receive a user input for controlling the robot 1000. The input interface 1500 may receive a user input and transmit the user input to the processor 1100.

The input interface 1500 may include, but is not limited to, a user input electronic device, such as a touch panel configured to sense a user's touch operation, a button configured to receive user's push manipulation, a wheel configured to receive user's rotation manipulation, a keyboard, a dome switch, and the like.

Also, the input interface 1500 may include a voice recognition device for voice recognition. For example, the voice recognition device may include the microphone 1200, and the voice recognition device may receive a user's voice command or voice request. Accordingly, the processor 1110 may control an operation corresponding to the voice command or the voice request to be performed.

The memory 1400 may store various information, data, instructions, programs, etc. required for the operation of the robot 1000. The memory 1400 may include at least one of a volatile memory or a non-volatile memory or a combination of the volatile memory and the non-volatile memory. The memory 1400 may include at least one type of storage medium from among a flash memory type, a hard disk type, a multimedia card micro type, a card type memory (e.g., an SD or XD memory), random-access memory (RAM), static RAM (SRAM), read-only memory (ROM), electrically erasable programmable (ROM) (EEPROM), programmable ROM (PROM), a magnetic memory, a magnetic disk, and an optical disk. Also, the robot 1000 may operate a web storage or a cloud server performing a storage function on the Internet.

The communication module 1300 may transmit and receive, according to a protocol, information to and from an external device or an external server, according to control by the processor 1100. The communication module 1300 may include at least one communication module and at least one port for transmitting and receiving data to and from the external device (not shown).

Also, the communication module 1300 may perform communication with the external device through at least one wired or wireless communication network. The communication module 1300 may include at least one of a short-range communication module 1310 or a remote communication module 1320 or a combination of the short-range communication module 1310 and the remote communication module 1320. The communication module 1300 may include at least one antenna for wirelessly communicating with another device.

The short-range communication module 1310 may include at least one communication module (not shown) performing communication according to the communication standards, such as Bluetooth, Wifi, Bluetooth low energy (BLE), near-field communication (NFC)/radio-frequency identification (RFID), Wifi direct (WFD), ultra wideband (UWB), Zigbee, and the like. Also, the remote communication module 1320 may include a communication module (not shown) performing communication through a network for Internet communication. Also, the remote communication module 1320 may include a mobile communication module performing communication according to the communication standards, such as the third generation (3G), the fourth generation (4G), the fifth generation (5G), and/or the sixth generation (6G).

Also, the communication module 1300 may include a communication module which may receive a control command from a remote controller (not shown) in a short-range distance, such as an infrared (IR) communication module, etc.

The cleaning module 1900 may include a brush 1910, a dustbin 1920, a suction motor 1930, and a mop device 1940.

The suction motor 1930 (or a vacuum motor) may suck air through a suction hole (not shown) of the robot 1000 by rotating a fan (not shown) connected to the suction motor 1930. The suction motor 1930 may include a direct current (DC) suction motor, a dry suction motor, and a wet suction motor, but is not limited thereto.

The brush 1910 may include a strand brush including a plurality of brush strands or a cotton flannel brush including cotton flannel, but is not limited thereto. The brush 1910 may rotate by using power transmitted from a brush motor (not shown). The brush 1910 may move dust or foreign materials adhering to a floor area to the suction hole (not shown) by sweeping the dust or foreign materials.

The dustbin 1920 may store dust sucked through the suction hole of the robot 1000 and filtered by a dust filter (not shown).

The mop device 1940 may perform wet wiping by rotating a wet cleaning pad coupled to the bottom of the robot 1000.

The sensor 1700 may include various types of sensors.

For example, the sensor 1700 may include the TOF LiDAR sensor 1710, the obstacle detection sensor 1720, the object recognition sensor 1730, and the falling prevention sensor 1740.

The TOF LiDAR sensor 1710 may include a transmitter (not shown) emitting a laser pulse signal and a receiver (not shown) receiving a reflection signal of the emitted laser pulse signal. The processor 1100 may determine a distance to peripheral objects of the robot 1000 or a position of the objects on a map by controlling the TOF LiDAR sensor 1710.

The obstacle detection sensor 1720 may output infrared rays or ultrasonic waves and receive a reflection signal reflected from an obstacle. The processor 1100 may control the obstacle detection sensor 1720 to detect whether or not there is an obstacle on a front side.

The object recognition sensor 1730 may include a 2D camera sensor and a 3D camera sensor. The object recognition sensor 1730 may photograph the front side of the robot 1000 and identify types and positions of objects in a photographed image.

The falling prevention sensor 1740 may include an infrared emitter (not shown) and an infrared receiver (not shown) provided toward the floor. The processor 1100 may output infrared rays toward the floor by controlling the infrared emitter of the falling prevention sensor 1740 and may receive a reflection signal reflected from the floor by controlling the infrared receiver. The processor 1100 may detect a distance from the robot 1000 to the floor based on the received reflection signal. Also, the processor 1100 may identify whether or not falling is possible and a threshold, based on the distance to the floor.

Also, the sensor 1900 may include a plurality of sensors configured to detect information with respect to a peripheral environment of the robot 1000. For example, the sensor 1900 may include an ultrasonic sensor (not shown), a motion sensor (not shown), etc., but is not limited thereto.

The processor 1100 may obtain information about a distance between the robot 1000 and peripheral objects of the robot 1000. For example, the processor 1100 may output a laser pulse signal having a default pulse energy to a peripheral region of the robot 1000 and may obtain the information about the distance between the robot 1000 and the peripheral objects of the robot 1000 based on a reflection signal of the output laser pulse signal. Also, for example, based on a pre-stored map indicating positions of the peripheral objects of the robot 1000 and a position of the robot 1000 on the map, the processor 1100 may obtain the information about the distance from the robot 1000 to the peripheral objects of the robot 1000.

The processor 1100 may determine, based on the obtained information about the distance, to change an energy of a laser pulse signal of the TOF LiDAR sensor to a short-range pulse energy for short-range objects and a remote pulse energy for remote objects. In this case, the short-range pulse energy for the short-range objects may be less than the default pulse energy. Also, the robot 1000 may determine the short-range pulse energy to be proportionate to a size of an intensive cleaning area or a size of a cleaning area. Also, the remote pulse energy may be greater than the default pulse energy or may be equal to the default pulse energy.

The processor 1100 may output the laser pulse signals of the TOF LiDAR sensor 1710 by switching the laser pulse signal of the short-range pulse energy and the laser pulse signal of the remote pulse energy, while the TOF LiDAR sensor 1710 rotates.

For example, the processor 1100 may output the laser pulse signal having the short-range pulse energy during a rotation cycle of the TOF LiDAR sensor 1710 and the laser pulse signal having the remote pulse energy during a next rotation cycle of the rotation cycle.

Also, for example, the processor 1100 may output the laser pulse signal having the short-range pulse energy, according to an angular range of the short-range objects, and may output the laser pulse signal having the remote pulse energy, according to an angular range of the remote objects.

Based on reflection signals of the laser pulse signals, received from the peripheral objects of the robot 1000, the processor 1100 may correct the information about the distance between the robot 1000 and the peripheral objects of the robot 1000.

For example, the processor 1100 may generate a short-range map based on a reflection signal of the laser pulse signal of the short-range pulse energy and may generate a remote map based on a reflection signal of the laser pulse signal of the remote pulse energy. Also, the processor 1100 may correct the map with respect to the peripheral objects of the robot 1000 by combining the short-range map and the remote map.

The processor 1100 may control a driving module to drive based on the corrected distance information. For example, the processor 1100 may control the driving module to drive based on the corrected map.

The processor 1100 may identify a type of at least one of the peripheral objects of the robot 1000 as a chair or a table. Also, when the processor 1100 identifies the chair or the table, the processor 1100 may start an intensive cleaning mode for intensively cleaning a space between the legs of the chair or the table. Also, based on the start of the intensive cleaning mode, the processor 1100 may output the laser pulse signal having the short-range pulse energy during a rotation cycle of the TOD LiDAR sensor 1710 and may output the laser pulse signal having the remote pulse energy during a next rotation cycle.

The processor 1100 may identify an obstacle from among the peripheral objects of the robot 1000 and may start an obstacle-outline-following mode for deviating from a predetermined driving route and following an outline of the identified obstacle. Based on the start of the obstacle-outline-following mode, the processor 1100 may output the laser pulse signal having the short-range pulse energy during a rotation cycle of the TOD LiDAR sensor 1710 and may output the laser pulse signal having the remote pulse energy during a next rotation cycle.

When the robot 1000 returns to a charge station to dock to the charge station, the processor 1100 may detect a docking guide signal emitted from the charge station. When the docking guide signal is detected, the processor 1100 may output the laser pulse signal of the TOF LiDAR sensor 1710, based on a docking pulse energy for reducing interference with respect to the docking guide signal.

Machine-readable storage media may be provided as non-transitory storage media. Here, the term "non-transitory storage media" only denotes that the media are tangible devices, rather than signals (e.g., electromagnetic waves), and does not distinguish the storage media semi-permanently storing data and the storage media temporarily storing data. For example, the "non-transitory storage media" may include buffers temporarily storing data.

According to an embodiment of the disclosure, the method according to various embodiments disclosed in the present specification may be provided as an inclusion of a computer program product. The computer program product may be, as a product, transacted between a seller and a purchaser. The computer program product may be distributed in the form of a machine-readable storage medium (e.g., a compact disc (CD)-ROM) or may be distributed directly between two user devices (e.g., smartphones) or online (e.g., downloaded or uploaded) through an application store. In the case of the online distribution, at least part of the computer program product (e.g., a downloadable application) may be at least temporarily stored in a machine-readable storage medium, such as a server of a manufacturer, a server of an application store, or a memory of a relay server, or may be temporarily generated.

What is claimed is:

1. A robot comprising:
a driving module;
a time of flight (TOF) light detection and ranging (LiDAR) sensor;
at least one memory storing one or more instructions; and
at least one processor configured to execute the one or more instructions stored in the at least one memory to:
    obtain information about a distance between the robot and peripheral objects of the robot by outputting a laser pulse signal of the TOF LiDAR sensor of a default pulse energy,
    determine, based on the obtained information about the distance, whether to change the default pulse energy of the laser pulse signal of the TOF LiDAR sensor to a short-range pulse energy for short-range objects and a remote pulse energy for remote objects, wherein the short-range pulse energy and the remote pulse energy are different than the default pulse energy,
    based on determining not to change the default pulse energy of the laser pulse signal of the TOF LiDAR sensor to the short-range pulse energy for short-range objects and the remote pulse energy for remote objects, continue outputting the laser pulse signal of the TOF LIDAR sensor of the default pulse energy,
    based on determining to change the default pulse energy of the laser pulse signal of the TOF LIDAR sensor to the short-range pulse energy for short-range objects and the remote pulse energy for remote objects,
    output laser pulse signals of the TOF LiDAR sensor by continuously switching between a laser pulse signal of the short-range pulse energy and a laser pulse signal of the remote pulse energy, while the TOF LiDAR sensor rotates,
    correct the information about the distance between the robot and the peripheral objects of the robot, based on reflection signals of the laser pulse signal of the short-range pulse energy and the laser pulse signal of the remote pulse energy, the reflection signals being received from the peripheral objects of the robot, and
    control the driving module to move the robot based on the corrected information about the distance.

2. The robot of claim 1, wherein, to output laser pulse signals of the TOF LiDAR sensor by continuously switching between a laser pulse signal of the short-range pulse energy and a laser pulse signal of the remote pulse energy, while the TOF LiDAR sensor rotates, the at least one processor is further configured to execute the one or more instructions stored in the at least one memory to:
    output the laser pulse signal of the short-range pulse energy during a rotation cycle of the TOF LIDAR sensor and output the laser pulse signal of the remote pulse energy during a next rotation cycle of the rotation cycle.

3. The robot of claim 2, wherein, to output laser pulse signals of the TOF LiDAR sensor by continuously switching between a laser pulse signal of the short-range pulse energy and a laser pulse signal of the remote pulse energy, while the TOF LiDAR sensor rotates, the at least one processor is further configured to execute the one or more instructions stored in the at least one memory to:
    identify a type of at least one object from among the peripheral objects of the robot as a chair or a table,
    when the chair or the table is identified, start an intensive cleaning mode for intensively cleaning a space between legs of the chair or the table, and
    based on the start of the intensive cleaning mode, output the laser pulse signal of the short-range pulse energy during the rotation cycle of the TOF LiDAR sensor and output the laser pulse signal of the remote pulse energy during the next rotation cycle.

4. The robot of claim 2, wherein, to output laser pulse signals of the TOF LiDAR sensor by continuously switching between a laser pulse signal of the short-range pulse energy and a laser pulse signal of the remote pulse energy, while the TOF LiDAR sensor rotates, the at least one processor is further configured to execute the one or more instructions stored in the at least one memory to:
    identify an obstacle from among the peripheral objects of the robot,
    start an obstacle-outline-following mode for deviating from a predetermined driving route and following an outline of the identified obstacle, and
    based on the start of the obstacle-outline-following mode, output the laser pulse signal of the short-range pulse energy during the rotation cycle of the TOF LiDAR sensor and output the laser pulse signal of the remote pulse energy during the next rotation cycle.

5. The robot of claim 1, wherein, to output laser pulse signals of the TOF LiDAR sensor by continuously switching between a laser pulse signal of the short-range pulse energy and a laser pulse signal of the remote pulse energy, while the TOF LiDAR sensor rotates, the at least one processor is further configured to execute the one or more instructions stored in the at least one memory to:

output the laser pulse signal of the short-range pulse energy according to an angular range of the short-range objects and output the laser pulse signal of the remote pulse energy according to an angular range of the remote objects.

6. The robot of claim 1, wherein the at least one processor is further configured to execute the one or more instructions stored in the at least one memory to:

generate a short-range map based on a reflection signal of the laser pulse signal of the short-range pulse energy, generate a remote map based on a reflection signal of the laser pulse signal of the remote pulse energy, and combine the short-range map and the remote map so as to generate a map about the peripheral objects of the robot.

7. The robot of claim 1, wherein the at least one processor is further configured to execute the one or more instructions stored in the at least one memory to:

when the robot detects a docking guide signal that is output from a charge station while the robot returns to the charge station to dock to the charge station, output the laser pulse signals of the TOF LIDAR sensor, based on a docking pulse energy for reducing interference with respect to the docking guide signal.

8. The robot of claim 1, wherein the at least one processor is further configured to execute the one or more instructions stored in the at least one memory to:

determine a cleaning area along which the robot is to move, and determine, based on a size of the cleaning area, a size of the short-range pulse energy.

9. A driving method of a robot, the driving method comprising:

obtaining information about a distance between the robot and peripheral objects of the robot by outputting a laser pulse signal of a time of flight (TOF) light detection and ranging (LiDAR) sensor of a default pulse energy;

determining, based on the obtained information about the distance, whether to change the default pulse energy of the laser pulse signal of the TOF LiDAR sensor to a short-range pulse energy for short-range objects and a remote pulse energy for remote objects, wherein the short-range pulse energy and the remote pulse energy are different than the default pulse energy;

based on determining not to change the default pulse energy of the laser pulse signal of the TOF LIDAR sensor to the short-range pulse energy for short-range objects and the remote pulse energy for remote objects, continue outputting the laser pulse signal of the TOF LiDAR sensor of the default pulse energy, based on determining to change the default pulse energy of the laser pulse signal of the TOF LIDAR sensor to the short-range pulse energy for short-range objects and the remote pulse energy for remote objects, outputting laser pulse signals of the TOF LiDAR sensor by continuously switching between a laser pulse signal of the short-range pulse energy and a laser pulse signal of the remote pulse energy, while the TOF LiDAR sensor rotates;

correcting the information about the distance between the robot and the peripheral objects of the robot, based on reflection signals of the laser pulse signal of the short-range pulse energy and the laser pulse signal of the remote pulse energy, the reflection signals being received from the peripheral objects of the robot; and moving the robot based on the corrected information about the distance.

10. The driving method of claim 9, wherein the outputting of the laser pulse signals of the TOF LiDAR sensor includes:

outputting the laser pulse signal of the short-range pulse energy during a rotation cycle of the TOF LIDAR sensor and outputting the laser pulse signal of the remote pulse energy during a next rotation cycle of the rotation cycle.

11. The driving method of claim 10, wherein the determining whether to change the default pulse energy of the laser pulse signal of the TOF LiDAR sensor to the short-range pulse energy for short-range objects and the remote pulse energy for remote objects includes:

identifying a type of at least one object from among the peripheral objects of the robot as a chair or a table;

when the chair or the table is identified, starting an intensive cleaning mode for intensively cleaning a space among legs of the chair or the table; and based on the start of the intensive cleaning mode, determining to change the default pulse energy of the laser pulse signal of the TOF LiDAR sensor to the short-range pulse energy for short-range objects and the remote pulse energy for remote objects.

12. The driving method of claim 10, wherein the determining whether to change the default pulse energy of the laser pulse signal of the TOF LIDAR sensor to the short-range pulse energy for short-range objects and the remote pulse energy for remote objects further includes:

identifying an obstacle from among the peripheral objects of the robot;

starting an obstacle-outline-following mode for deviating from a predetermined driving route and following an outline of the identified obstacle; and based on the start of the obstacle-outline-following mode, determining to change the default pulse energy of the laser pulse signal of the TOF LiDAR sensor to the short-range pulse energy for short-range objects and the remote pulse energy for remote objects.

13. The driving method of claim 9, wherein the outputting of the laser pulse signals of the TOF LiDAR sensor includes:

outputting the laser pulse signal of the short-range pulse energy according to an angular range of the short-range objects and outputting the laser pulse signal of the remote pulse energy according to an angular range of the remote objects.

14. The driving method of claim 9, wherein the correcting of the information about the distance between the robot and the peripheral objects of the robot includes:

generating a short-range map based on a reflection signal of the laser pulse signal of the short-range pulse energy, generating a remote map based on a reflection signal of the laser pulse signal of the remote pulse energy, and combining the short-range map and the remote map so as to generate a map about the peripheral objects of the robot.

15. The driving method of claim 9, further comprising:

when the robot returns to a charge station to dock to the charge station, detecting a docking guide signal that is output from the charge station; and when the docking guide signal is detected, outputting the laser pulse signals of the TOF LiDAR sensor, based on a docking pulse energy for reducing interference with respect to the docking guide signal.

16. A non-transitory computer-readable recording medium having recorded thereon a program for executing the driving method of claim 9, on a computer.

* * * * *